US008908639B2

(12) United States Patent
Nguyen et al.

(10) Patent No.: US 8,908,639 B2
(45) Date of Patent: Dec. 9, 2014

(54) METHODS FOR HANDOFF OF AN ACTIVE COMMUNICATION CONNECTION FROM A MACROCELL TO A FEMTOCELL

(75) Inventors: Steven Nguyen, Plano, TX (US); Dennis Eriksson, Plano, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 534 days.

(21) Appl. No.: 13/031,668

(22) Filed: Feb. 22, 2011

(65) Prior Publication Data

US 2012/0213198 A1 Aug. 23, 2012

(51) Int. Cl.
*H04W 4/00* (2009.01)
*H04W 36/04* (2009.01)
*H04W 36/00* (2009.01)

(52) U.S. Cl.
CPC .......... *H04W 36/0055* (2013.01); *H04W 36/04* (2013.01); *H04W 36/00* (2013.01); *H04W 36/0016* (2013.01); *H04W 36/0005* (2013.01); *H04W 36/0011* (2013.01)
USPC ........... 370/331; 455/436; 455/437; 455/439; 455/442; 455/444

(58) Field of Classification Search
CPC ..... H04W 36/18; H04W 36/14; H04W 76/02; H04W 36/0022; H04W 36/0055; H04W 36/06; H04W 36/0011; H04W 36/08; H04W 36/0061; H04W 36/0016; H04W 36/0005; H04L 65/1006; H04L 36/00
USPC .......................... 370/331, 352; 455/436–444
See application file for complete search history.

(56) References Cited

U.S. PATENT DOCUMENTS

| | | | |
|---|---|---|---|
| 2003/0117977 A1* | 6/2003 | Kang | 370/331 |
| 2004/0053614 A1* | 3/2004 | Il-Gyu et al. | 455/436 |
| 2005/0032551 A1* | 2/2005 | Lee et al. | 455/560 |
| 2005/0101325 A1* | 5/2005 | Semper | 455/436 |
| 2005/0159158 A1* | 7/2005 | Pardeep et al. | 455/436 |
| 2007/0129075 A1* | 6/2007 | Kim et al. | 455/436 |
| 2007/0147303 A1* | 6/2007 | Noh | 370/331 |
| 2008/0020771 A1* | 1/2008 | Trayer | 455/439 |
| 2008/0293418 A1* | 11/2008 | Choksi et al. | 455/436 |
| 2009/0067417 A1* | 3/2009 | Kalavade et al. | 370/356 |
| 2009/0303895 A1* | 12/2009 | Zhang et al. | 370/252 |
| 2011/0212723 A1* | 9/2011 | Kunz et al. | 455/435.1 |

OTHER PUBLICATIONS

3GPP2: "cdma200 Femtocell Network: 1x and IMS", 3GPP2, No. 3GPP2 X.S0059-200-0 Jan. 1, 2010, XP002664705, Retrieved from the Internet: URL:http://www.3gpp2.org/public_html/specs/X.S0059-200-0_v1.0_100216.pdf [retrieved on Nov. 30, 2011].

* cited by examiner

*Primary Examiner* — Melanie Jagannathan
*Assistant Examiner* — Najeebuddin Ansari

(57) ABSTRACT

A method for performing a handoff of an active communication connection for a mobile user station from a macrocell to one or more femtocells. In one aspect, the present invention provides an improved handoff for situations in which the mobile user station is moved into an indoor residential or enterprise environment within which the signal strength of the mobile user station with respect to the macrocell base transceiver station becomes relatively low. In one embodiment, the method efficiently performs a handoff of an active communication connection from a macrocell to one or more femtocells while minimizing the likelihood of dropping the active communication connection during the handoff.

18 Claims, 19 Drawing Sheets

METHODS FOR HANDOFF OF AN ACTIVE COMMUNICATION CONNECTION FROM A MACROCELL TO A FEMTOCELL

TECHNICAL FIELD

The present invention relates to wireless communication systems, and more particularly, to a method for handing off an active communication connection from a macrocell to a femtocell.

BACKGROUND

The IP Multimedia Subsystem (IMS), as defined by 3GPP and 3GPP2, merges telephony and Internet technology by providing an all-IP based architecture for the telecommunications industry. The IMS is based on the Session Initiation Protocol (SIP) and makes heavy use of the protocols defined within the Internet Engineering Task Force (IETF). The system offers a network of servers and databases that assist a user agent with the task of establishing and managing sessions. IMS uses the term "sessions," because the connections between users are no longer limited to voice services (i.e., a telephone call). Sessions may be voice, video, text, or other services connecting two or more user agents together.

Referring now to FIG. 1, the IMS architecture 100 includes User Equipment (UE) 125, Call Session Control Functions (CSCF) 115, Home Subscriber Server (HSS) 120 and Application Servers 105 and 110.

The UE includes a device that contains the SIP User Agent that will initiate or terminate sessions.

The CSCFs 115 are responsible for managing the sessions, including security and interconnect. There are three types of CSCFs. First, a Proxy CSCF (P-CSCF) resides at the edge of the network and serves as an entry point for the UE into the IMS core. Second, an Interrogating CSCF (I-CSCF) serves as an entry point into the network for peering networks. The I-CSCF also acts as the lookup function for finding the appropriate serving node for a subscriber. Third, a Serving CSCF (S-CSCF) is responsible for authenticating the UE and managing ongoing sessions for the UE, including invocation of applications. The S-CSCF communicates with the HSS in order to retrieve the UE authentication information. After the user has been authenticated, the S-CSCF again communicates with the HSS 120 to retrieve the user profile which specifies the services to which a user has subscribed and which applications servers are to be invoked for those services.

The HSS 120 stores the relevant user data, including authentication information and service data. As part of the user profile, initial Filter Criteria (iFC) are defined to indicate which application servers are to be invoked, based on information in the signaling plane.

Applications Servers 105, 110 are invoked based on the iFC that are stored in the user profile. The S-CSCF will pass signaling onto an Application Server if the criteria defined in the iFC are met. Once invoked, the application server can take part in the session and provide additional capabilities.

Referring now to FIG. 2A, the architecture 200 of the converged CDMA IMS Femtocell system, as shown in FIG. 1 of section 5.1.1 of 3GPP2-X.S0059 Femtocell Overview, is illustrated.

The converged CDMA IMS Femtocell system includes a CDMA Femtocell Access Point (FAP) 238, which is a CDMA 2000 1x access point that provides coverage in a small area, usually a private residence or a small office, and connects a mobile station (MS) 240 to an operator's network 228 via a broadband connection, such as, for example, DSL or cable. Typically, a residential FAP is a miniature base station that implements the CDMA base transceiver station function, the base station controller function, and the packet control function (PCF). A plain old telephone service (POTS) telephone can be connected to a FAP via an ATA port. A typical residential FAP has a range of approximately 15 feet.

Referring also to FIG. 2B, the converged CDMA IMS Femtocell system also includes a cluster 238 of up to n FAPs in large enterprises, where n=a maximum number of base stations supported in a soft handoff scenario in IS-95 or IS-2000. One FAP in the cluster is the Controlling FAP (CFAP) 272, and other individual FAPs may be designated as FAP1 270 and FAPn 274. In a macrocell-to-femtocells active mode handoff scenario, an individual FAP other than the CFAP 272 sends voice packets to the CFAP 272, which selects the strongest voice frame to send towards the IMS 224 via an enterprise router 276. In the downlink direction, the CFAP 272 receives a voice frame from the IMS 224 via the enterprise router 276 and sends the same voice frame to all of the FAPs, i.e., FAP1 270 and FAPn 274 involved in the soft handoff. Typically, an enterprise FAP is a miniature base station that implements the CDMA base transceiver station function, the base station controller function, and the packet control function (PCF). Enterprise FAPs are grouped by clusters. Each cluster has a Controlling FAP. All enterprise FAPs within a cluster communicate with each other via a local enterprise IP backbone 278. Signaling protocols between the CFAP 272 and the individual enterprise FAPs 270, 274 have not yet been defined by 3GPP2. Voice paths between the CFAP 272 and the individual enterprise FAPs 270, 274 may be established by using the Real-Time Transport Protocol.

The converged CDMA IMS Femtocell system also includes a Femtocell Management System (FMS) 230 that provides femtocell operation, administration, maintenance, and provisioning (OAM&P) functions.

The converged CDMA IMS Femtocell system also includes a Femtocell Authentication, Authorization, and Accounting (AAA) module 232 that provides a FAP authorization function. The AAA 232 sends authorization policy information to the Security Gateway (SeGW) 234. The SeGW authenticates the FAPs and protects the IP core network 228 from security attacks (e.g., denial of service) initiated by FAPs.

The converged CDMA IMS Femtocell system also includes IMS 224, an IP Multimedia Network 226, and an IP backbone network 228.

The converged CDMA IMS Femtocell system also includes a Media Gateway Control Function/Media Gateway (MGCF/MGW) 222 that connects IMS 224 to the legacy CDMA core network.

The converged CDMA IMS Femtocell system also includes a Femtocell Convergence Server (FCS) 210. The FCS 210 is an IMS Application Server that provides internetworking between the FAP, the SIP environment of IMS, and the appropriate Mobile Access Protocol (MAP) 212 network elements.

The converged CDMA IMS Femtocell system also includes legacy CDMA core network elements, including: the public switched telephone network (PSTN) 218 and a public safety answering point (PSAP) 220; a mobile switching center (MSC) 216; a base station controller (BSC) and a base station transceiver system (BTS) 214, a home location register (HLR) and authentication center (AC) 202; a position determining entity (PDE) 204; a mobile positioning center (MPE) 206; and a message center (MC) 208.

The MSC 216 is connected to the PSTN switch 218 via a TDM trunk. The MSC 216 is connected to the MGCF/MGW 222 via a nailed-up TDM trunk. The MSC 216 interacts with the HLR 202 and the CS 210 using IS-41 signaling. The MSC 216 is connected to at least one BSC via a T1 connection or an Ethernet connection. Each BSC controls at least one BTS 214 via a T1 connection or an Ethernet connection. An MSC 216 can be either a TDM mobile switching center or a "Soft Switch" MSC.

Referring now to FIG. 2C, the MSC 216 includes a radio access control function (RACF) subsystem 262, a call control function (CCF) subsystem 264, and a trunking subsystem 260. The RACF subsystem is responsible for paging, mobility management (e.g., location update), and handoff. The RACF subsystem 262 interfaces with the base station controllers 214 and 254, typically via either a T1 interface or an Ethernet interface. Base station controller 214 interfaces with base station transceivers 250 and 252 via T1 or Ethernet, and base station controller 254 interfaces with base station transceivers 256 and 258 via T1 or Ethernet. The mobile station 240 communicates with the base station transceiver having the highest signal strength at any given moment.

The RACF subsystem 262 performs handoffs in coordination with the base station controllers 214 and 254, the trunking subsystem 260, and the convergence server 210 via respective IS-41 interfaces.

The RACF subsystem 262 also interfaces with a home location register (HLR) 268 and a visitor location registry (VLR) 266. The HLR 268 contains subscriber information for the mobile stations of a plurality of subscribers. The VLR 266 contains information relating to all mobile stations which have registered with the MSC 216.

The CCF subsystem 264 is responsible for translating and routing calls. The trunking subsystem 260 is responsible for trunk connectivity with the PSTN 218, the MGCF/MGW 222, and other mobile switching centers.

Conventional systems include a capability to complete a handoff of an active communication connection from a femtocell to a macrocell, e.g., when a mobile user station moves from an indoor residential environment out into a generic macrocell environment. However, currently, the 3GPP2 femtocell standards and femtocell and convergence server vendors lack an efficient solution for handing off an active mobile user station (for example, a mobile user station that is on a call with another party) from a macrocell to a residential femtocell or to enterprise femtocells when the mobile user station moves into the femtocell coverage area. Consequently, a subscriber who is talking on a call via a macrocell base station and is moving to an indoor environment, such as a private residence, an enterprise, or a hotspot, will suffer from poor macrocell RF coverage in an indoor environment. Hence, there is a need for a method for efficiently performing a handoff from a macrocell to one or more femtocells that minimizes the likelihood of dropping the active communication connection during the handoff.

SUMMARY

In one aspect, particular embodiments of the disclosed solution provide methods for performing a handoff of an active communication connection for a mobile user station from a macrocell to a femtocell. Particular exemplary embodiments of the disclosed solution contemplate that the mobile user station is moved into an indoor residential environment within which the signal strength of the mobile user station with respect to the macrocell base transceiver station becomes relatively low. Other particular embodiments of the disclosed solution contemplate an enterprise environment, including a cluster of femtocell access points, into which the mobile user station is moved.

In one aspect, particular embodiments of the disclosed solution provide a method for performing a handoff of an active communication connection for a mobile user station from a macrocell to a femtocell is provided. At a mobile switching center corresponding to the macrocell, a first message is received. The first message is transmitted from a base station controller corresponding to the macrocell. The first message includes an indication that the active communication connection should be handed off to a femtocell access point corresponding to the femtocell. A second message is generated and transmitted to a target convergence server. The second message includes instructions for initiating the handoff. A third message is received. The third message is transmitted from the target convergence server. The third message includes an indication that the handoff has been successfully initiated. A fourth message is generated and transmitted to the base station controller. The fourth message includes a direction to the base station controller to commence the handoff. A fifth message is received. The fifth message is transmitted from the base station controller. The fifth message includes a handoff commencement acknowledgement. A sixth message is received from the target convergence server. The sixth message includes an indication of a completion of a successful handoff.

In another aspect of the particular embodiments of the disclosed solution, the handoff may be completed without a transmission of a Session Initiation Protocol (SIP) INVITE message between the target convergence server and the femtocell access point. The receiving of the first message may occur after the base station controller determines that a signal strength corresponding to the mobile user station is less than a predetermined threshold.

In some embodiments, the second message may include a femtocell identification and a Circuit Identifier Code (CIC) corresponding to a handoff trunk communication channel between the mobile switching center and a media gateway station. The media gateway station may be in communication with the femtocell access point.

In some embodiments, after the second message has been transmitted, the third message may be received after the target convergence server has transmitted a request message to the femtocell access point that includes a request that the femtocell access point prepare for handoff and the femtocell access point has transmitted an acknowledgement message to the target convergence server. The third message may be received without a transmission of an additional acknowledgement message from the target convergence server to the femtocell access point.

In some embodiments, after the fourth message has been transmitted, the fifth message may be received after the base station controller has transmitted a Universal Handoff Direction message to the mobile user station and the mobile user station has transmitted an acknowledgement message to the base station controller.

In some embodiments, after the fifth message has been received, the sixth message may be received after the femtocell access point (a) receives a first handoff completion message from the mobile user station and (b) transmits a second handoff completion message to the target convergence server.

In another aspect, particular embodiments of the disclosed solution provide a method for performing a handoff of an active communication connection for a mobile user station from a macrocell to a femtocell. At a femtocell access point corresponding to the femtocell, a first message is received.

The first message is transmitted from a convergence server. The first message includes a request to initiate a handoff from a base station controller corresponding to the macrocell. A second message is transmitted to the convergence server. The second message includes an acknowledgement of a receipt of the first message. A third message is received from the mobile user station. The third message includes a preamble message. A fourth message is transmitted to the mobile user station. The fourth message includes an acknowledgement of a receipt of the preamble message. A fifth message is received from the mobile user station. The fifth message includes an indication of a completion of the handoff. A sixth message is transmitted to the convergence server. The sixth message includes an indication of a successful completion of the handoff.

In another aspect of particular embodiments of the disclosed solution, the handoff may be completed without a transmission of a Session Initiation Protocol (SIP) INVITE message between the convergence server and the femtocell access point. The receiving of the first message may occur after the base station controller determines that a signal strength corresponding to the mobile user station is less than a predetermined threshold.

In some embodiments, after the second message is transmitted, the third message may be received without a transmission of an additional acknowledgement message from the target convergence server to the femtocell access point. The third message may be received after the base station controller has transmitted a Universal Handoff Direction Message to the mobile user station and the mobile user station has transmitted an acknowledgement message to the base station controller.

In yet another aspect, particular embodiments of the disclosed solution provide a method for performing a handoff of an active communication connection for a mobile user station from a macrocell to a femtocell. At the mobile user station, a first message is received. The first message is transmitted from a base station controller corresponding to the macrocell. The first message includes a handoff direction message. A second message is transmitted to the base station controller. The second message includes an acknowledgement of a receipt of the handoff direction message. A third message is transmitted to a femtocell access point corresponding to the femtocell. The third message includes at least one preamble frame. A fourth message is received from the femtocell access point. The fourth message includes an acknowledgement of a receipt of the at least one preamble frame. A fifth message is transmitted to the femtocell access point. The fifth message includes an indication of a completion of the handoff. A sixth message is received from the femtocell access point. The sixth message includes an acknowledgement of a completion of the handoff. The mobile user station then communicates on the active communication connection via the femtocell access point.

In another aspect of particular embodiments of the disclosed solution, the handoff may be completed without a transmission or reception of a Session Initiation Protocol (SIP) INVITE message by the femtocell access point.

In some embodiments, the receiving of the first message may occur after the base station controller determines that a signal strength corresponding to the mobile user station is less than a predetermined threshold.

In some embodiments, at least one null frame may be received from the femtocell access point prior to receiving the first message, wherein the receiving at least one null frame occurs after the femtocell access point has received a request to initiate the handoff. Prior to receiving the at least one null frame, the femtocell access point may receive a handoff request message from a convergence server. After receiving the at least one null frame, the femtocell access point may transmit a message to the convergence server that includes an acknowledgement of a receipt of the handoff request message without receiving a further acknowledgement message from the convergence server prior to the mobile user station receiving the first message.

In some embodiments, after the sixth message is received, the femtocell access point may transmit a seventh message to a convergence server that includes an indication that the handoff has been successfully completed prior to the mobile user station communicating on the active communication connection via the femtocell access point.

In yet another aspect, particular embodiments of the disclosed solution provide a mobile switching station for performing a handoff of an active communication connection for a mobile user station from a macrocell to a femtocell. The mobile switching station includes a radio access control function (RACF) subsystem; a call control function (CCF) subsystem in communication with the RACF subsystem; and a trunking subsystem in communication with the RACF subsystem and with a public switched telephone network (PSTN). The RACF subsystem is in communication with the mobile user station via a base station controller corresponding to the macrocell and in communication with a target convergence server. When the mobile user station moves to within a predetermined range with respect to the femtocell, the RACF subsystem is configured to receive a first message transmitted from the base station controller. The first message includes an indication that the active communication connection should be handed off to a femtocell access point corresponding to the femtocell. The RACF subsystem is configured to generate a second message. The second message includes instructions for initiating the handoff. The RACF subsystem is further configured to transmit the second message to the target convergence server and to receive a third message from the target convergence server. The third message includes an indication that the handoff has been successfully initiated. The RACF subsystem is further configured to generate a fourth message. The fourth message includes a direction to commence the handoff. The RACF subsystem is further configured to transmit the fourth message to the base station controller and to receive a fifth message from the base station controller. The fifth message includes a handoff commencement acknowledgement. The RACF subsystem is further configured to receive a sixth message from the target convergence server. The sixth message includes an indication of a completion of a successful handoff. Upon successful handoff completion, the trunking subsystem is configured to provide a connection between the PSTN and the femtocell access point. The RACF subsystem is further configured to transmit a seventh message to the CCF subsystem. The seventh message includes an indication that the mobile user station is communicating with the mobile switching station via a nailed-up trunk.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Figure 1:
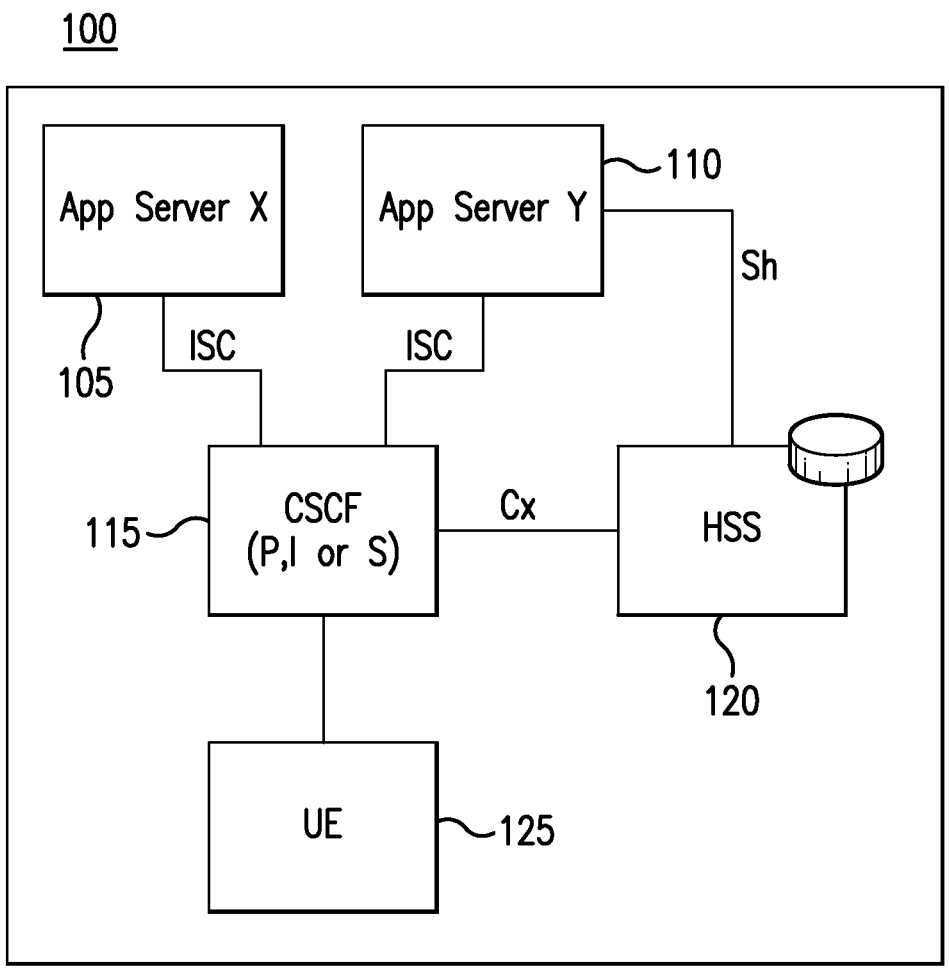
FIG. 1 illustrates a conventional logical network architecture of an IP Multimedia Subsystem (IMS).
Figure 2A:
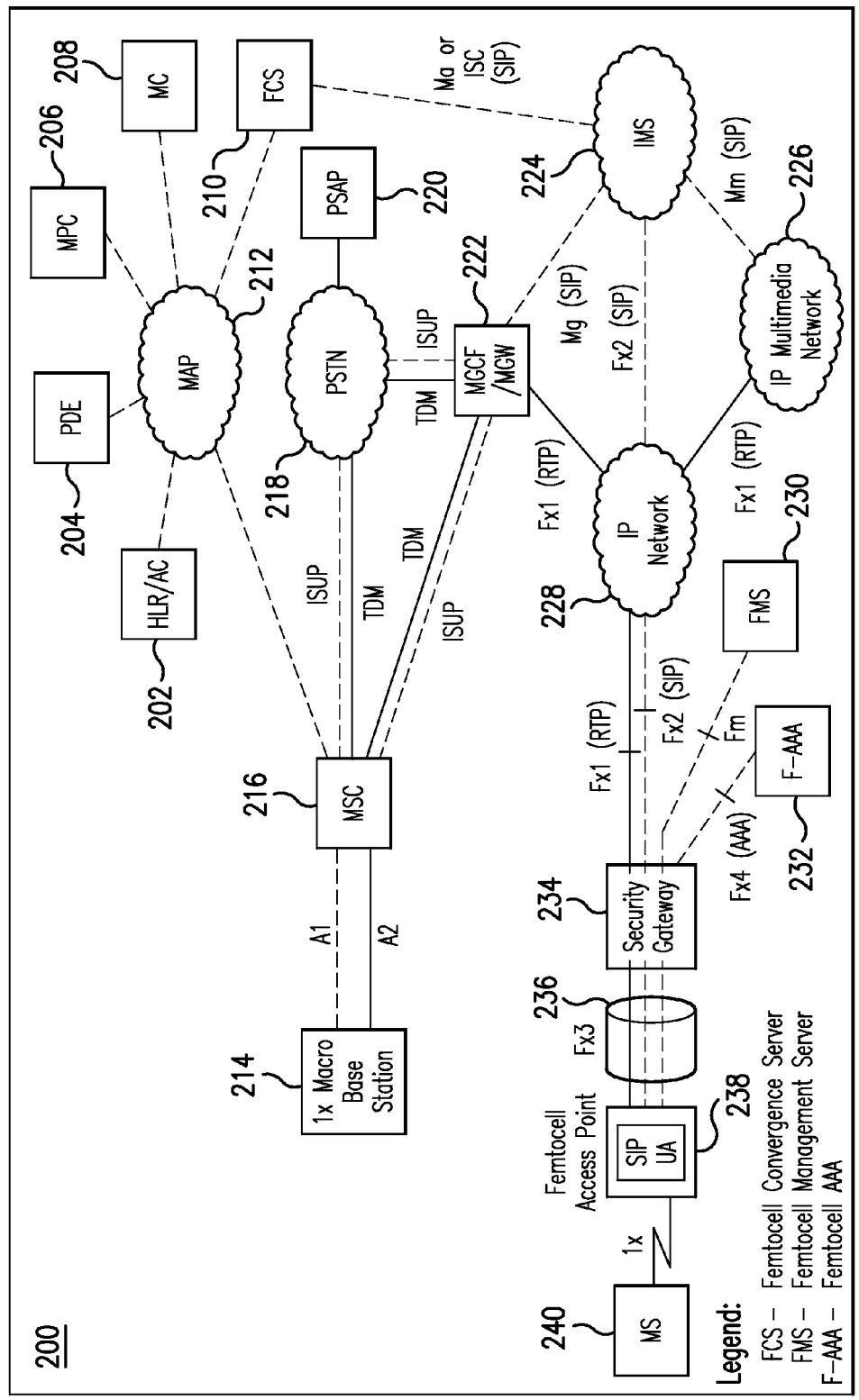
FIG. 2A illustrates a logical network architecture of a converged CDMA IMS Femtocell system.
Figure 2B:
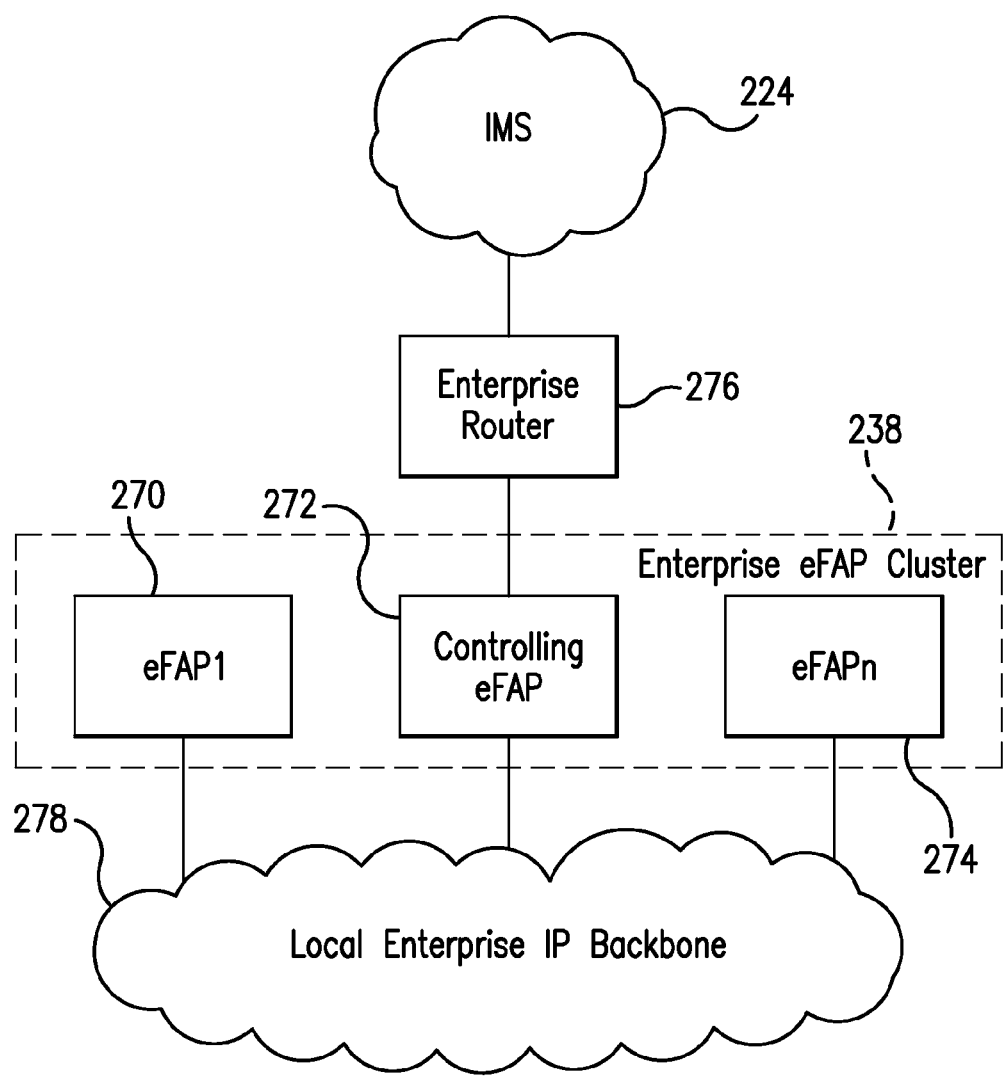
FIG. 2B illustrates a block diagram of an enterprise femtocell access point cluster as used in the architecture of FIG. 2A.
Figure 2C:
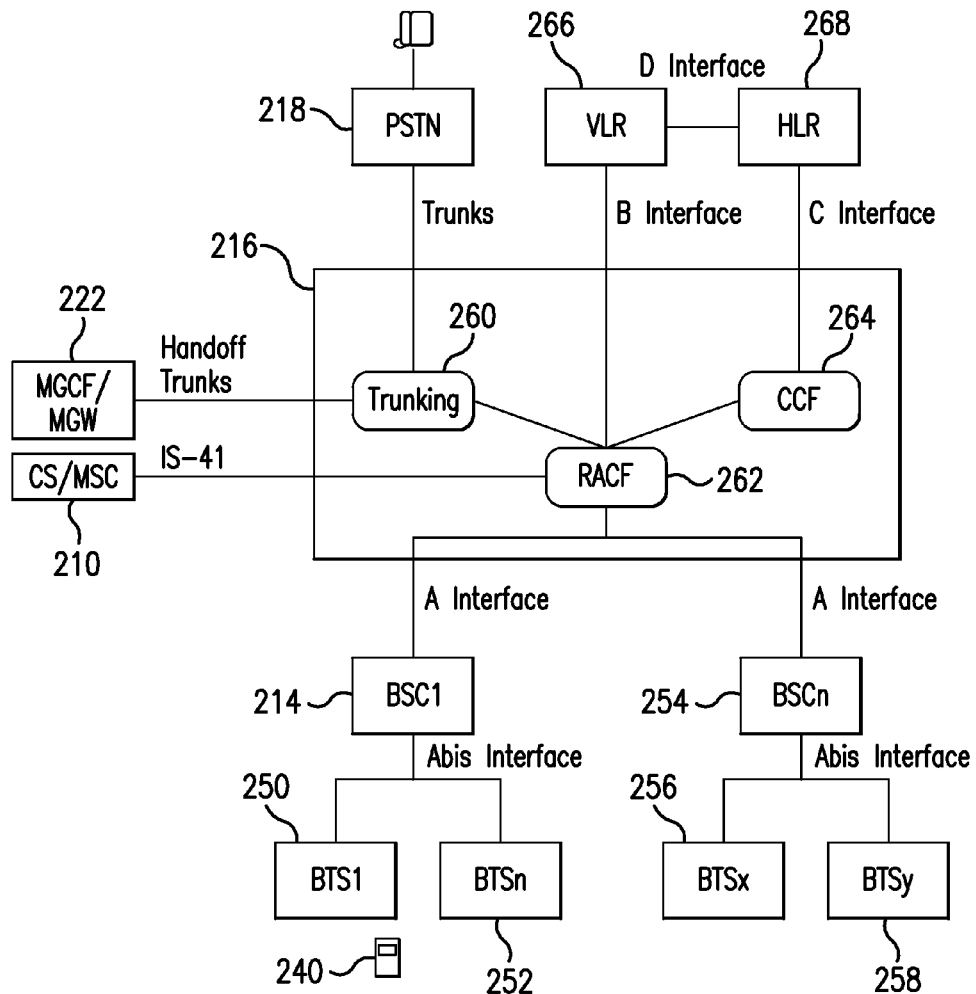
FIG. 2C illustrates a block diagram of a mobile switching center as used in the architecture of FIG. 2A.
Figure 3A:
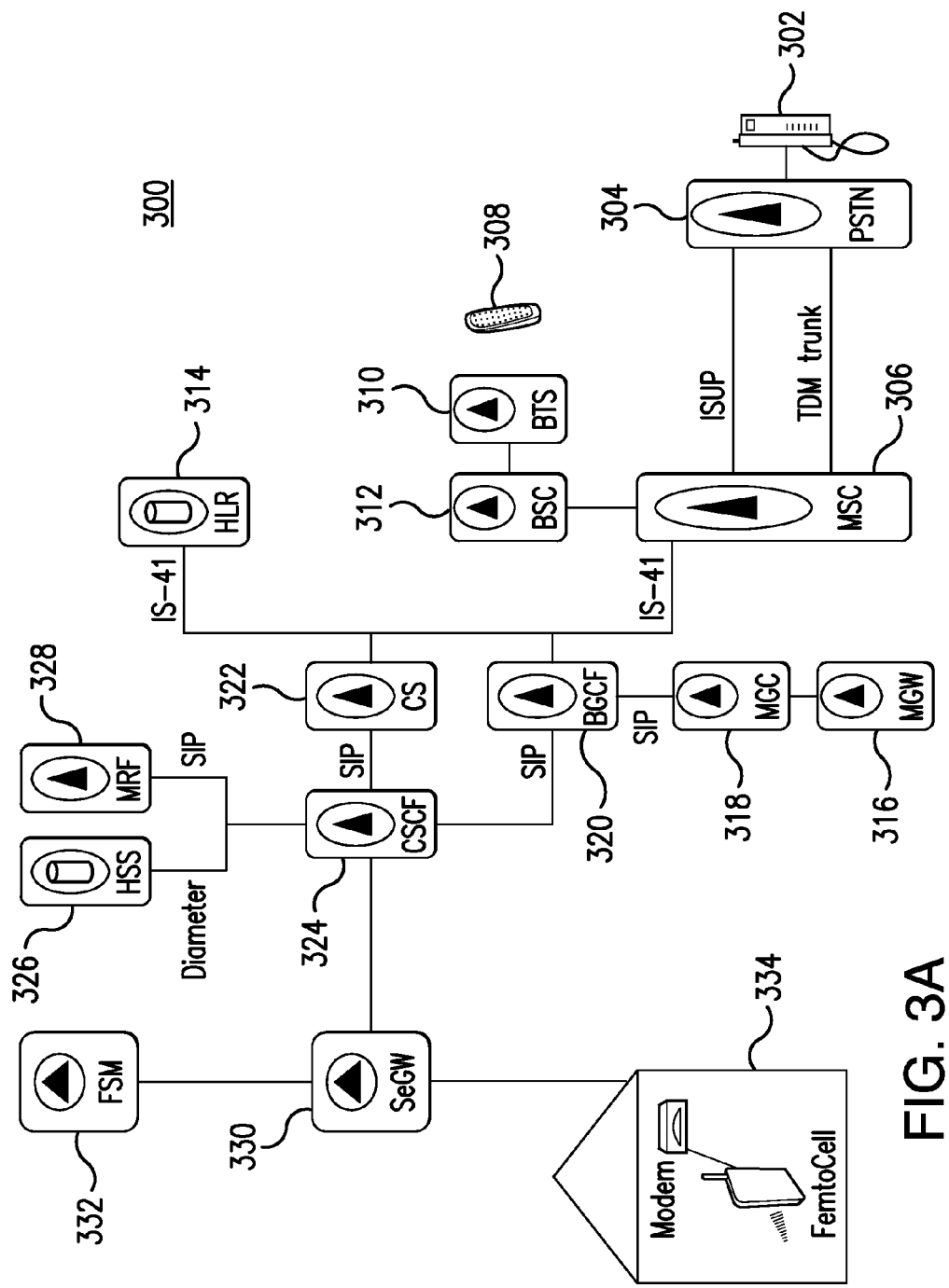
FIG. 3A illustrates a pre-handoff voice path of an active communication connection between a mobile subscriber and a PSTN subscriber in a macrocell network.

Referring now to FIG. 3A, a voice path 300 is illustrated for an active communication connection between a mobile subscriber and a PSTN subscriber in a macrocell network. The mobile subscriber uses a mobile user station (MUS) 308, which is wirelessly connected over a radio traffic channel to a base transceiver station (BTS) 310. The BTS 310 is controlled via a TDM trunk connection by a base station controller (BSC) 312 for the specific macrocell in which the MUS is geographically located. The BSC 312 is in communication via a TDM trunk connection with a mobile switching center (MSC) 306 which also corresponds to the macrocell. In an embodiment, the MUS is a CDMA mobile unit that supports IS-95/IS-200 and/or 1X EV-DO air interfaces.

The MSC 306 is in communication via a TDM trunk connection with the PSTN 304. The TDM trunk connection between the MSC 306 and the PSTN 304 may be an Integrated Service Digital Network (ISDN) User Part (ISUP) trunk or an inband signaling trunk.

Figure 3B:
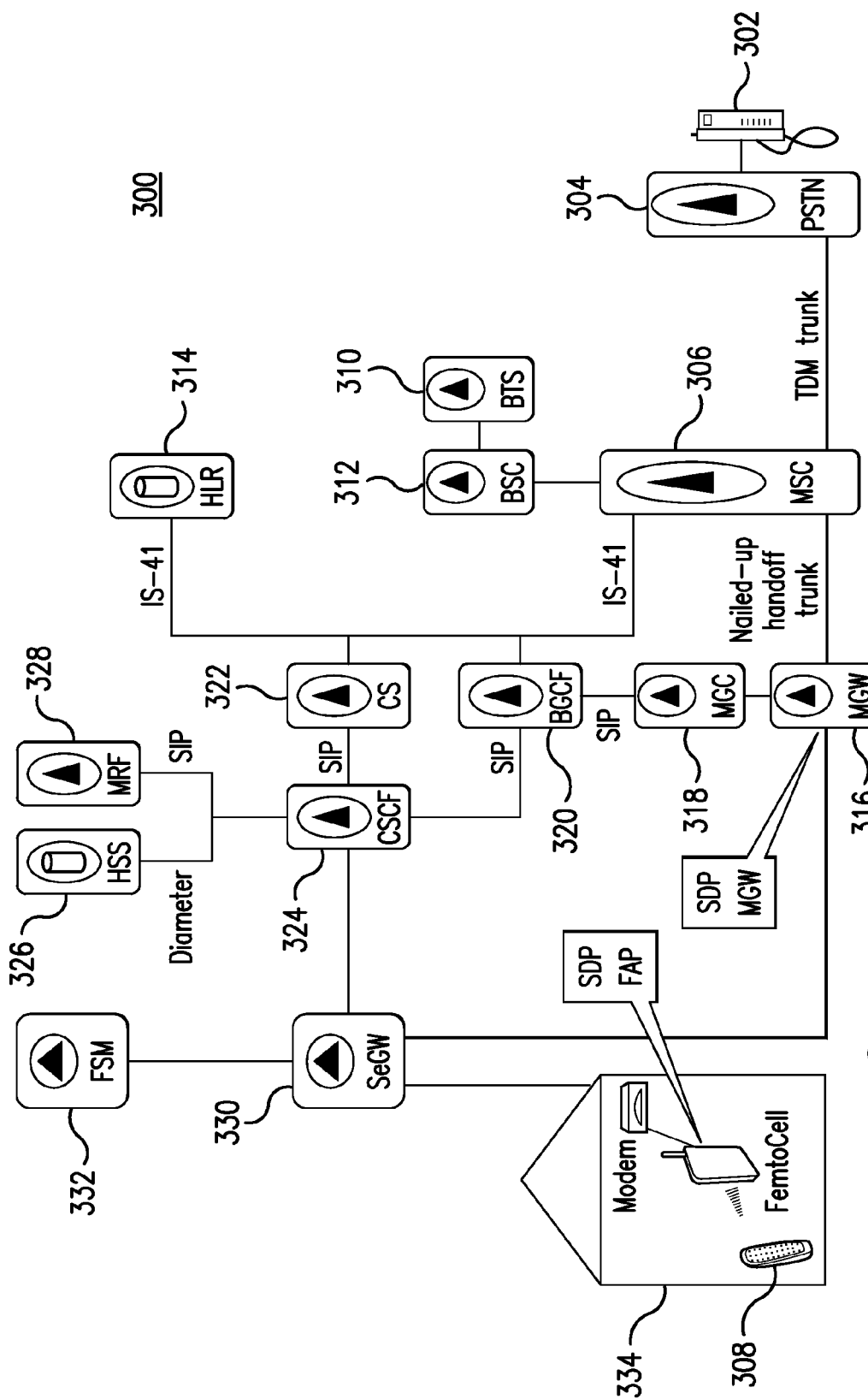
FIG. 3B illustrates a post-handoff voice path of the active communication connection of FIG. 3A.
Figure 3C:
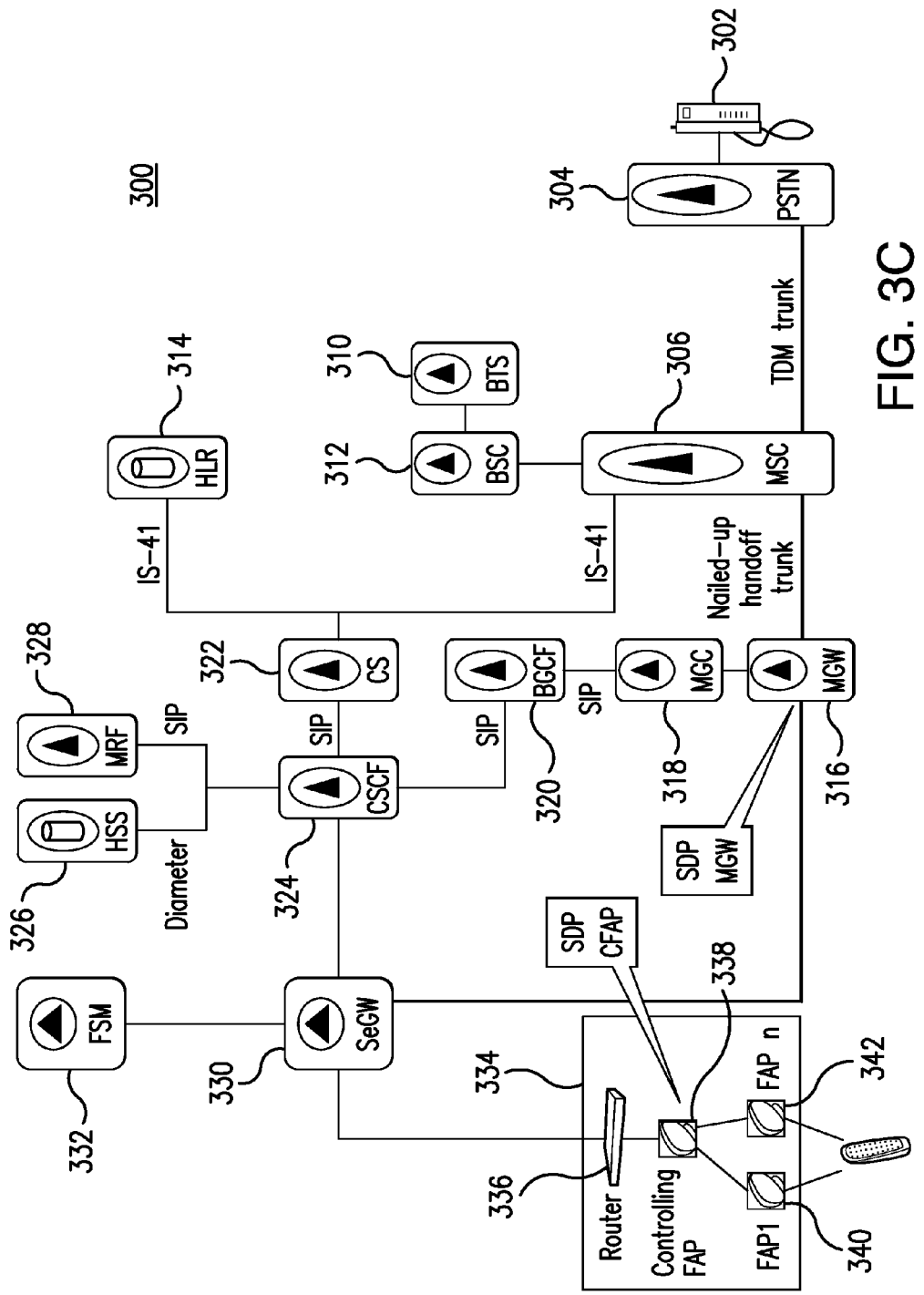
FIG. 3C illustrates a post-handoff voice path of an active communication connection in an enterprise femtocell scenario.

Referring now also to FIG. 3B and FIG. 3C, as the MUS 308 moves near to a residential femtocell access point (FAP) 334, the macrocell MSC 306 will hand the MUS 308 off to the femtocell network via IMS. FIG. 3B illustrates the voice path for the active communication connection between the mobile subscriber and the PSTN subscriber after the handoff from the macrocell network to the femtocell network.

The MUS 308 wirelessly communicates with the FAP 334 over a radio traffic channel. The FAP 334 communicates with the media gateway (MGW) 316 using Real-time Transport Protocol (RTP) via the security gateway (SeGW) 330. The media gateway 316 is in communication via a "nailed-up" TDM handoff trunk connection with the macrocell MSC 306, which remains in communication via a TDM trunk connection with the PSTN 304.

In the enterprise femtocell scenario, as illustrated in FIG. 3C, the FAP 334 includes a router 336, a controlling FAP 338, and additional access points FAP 1 340 and FAP n 342. The MUS 308 wirelessly communicates with either FAP 1 340 or FAP n 342, depending upon its physical proximity to the access points. The message communicated by MUS 308 then proceeds to the controlling FAP 338, the router 336, and then to MGW 316 via SeGW 330.

The operator uses the Femtocell Service Manager (FSM) 332 to provision the FAP 334 via the security gateway 330. The FAP 334 and security gateway 330 are in communication with the femtocell convergence server (CS) 322 via IMS call session control functions (CSCF) 324. The femtocell convergence server 322 communicates with a home location register 314 and with the macrocell mobile switching center 306 via an IS-41 connection.

The CSCF 324 communicates with home subscriber server 326 and a mobile relay facility 328. In addition, the CSCF 324 communicates with a breakout gateway control function (BGCF) 320, which is a SIP proxy that processes requests for routing from an S-CSCF when the S-CSCF has determined that the session cannot be routed using DNS or ENUM/DNS. The BGCF 320 includes routing functionality based on telephone numbers. The BGCF 320 may also be accessed by the media gateway 316 via the media gateway control (MGC) 318.

Figure 4A:
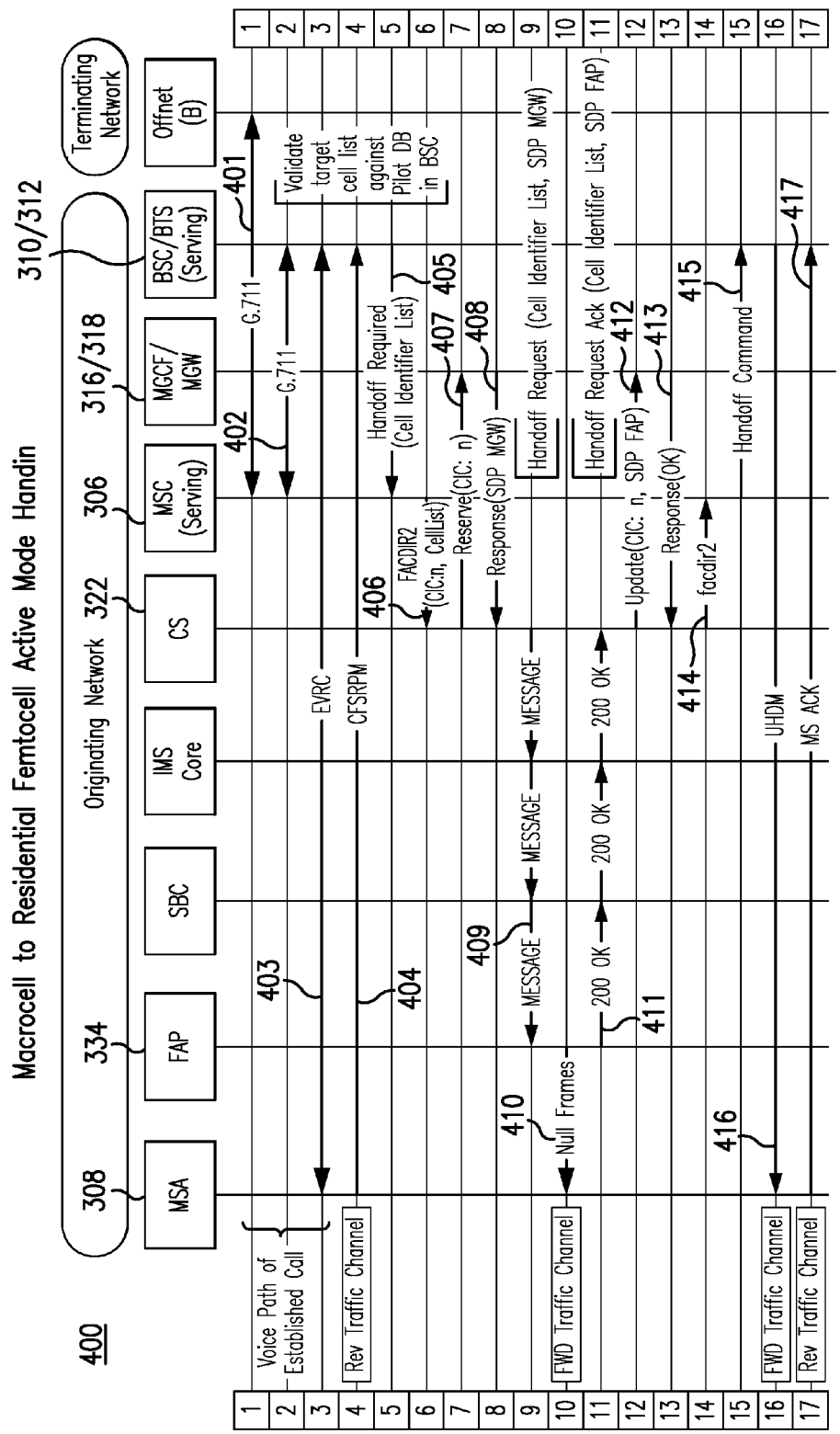
FIGS. 4A and 4B illustrate an active mode macrocell to residential femtocell handoff message sequence according to particular embodiments.
Figure 4B:
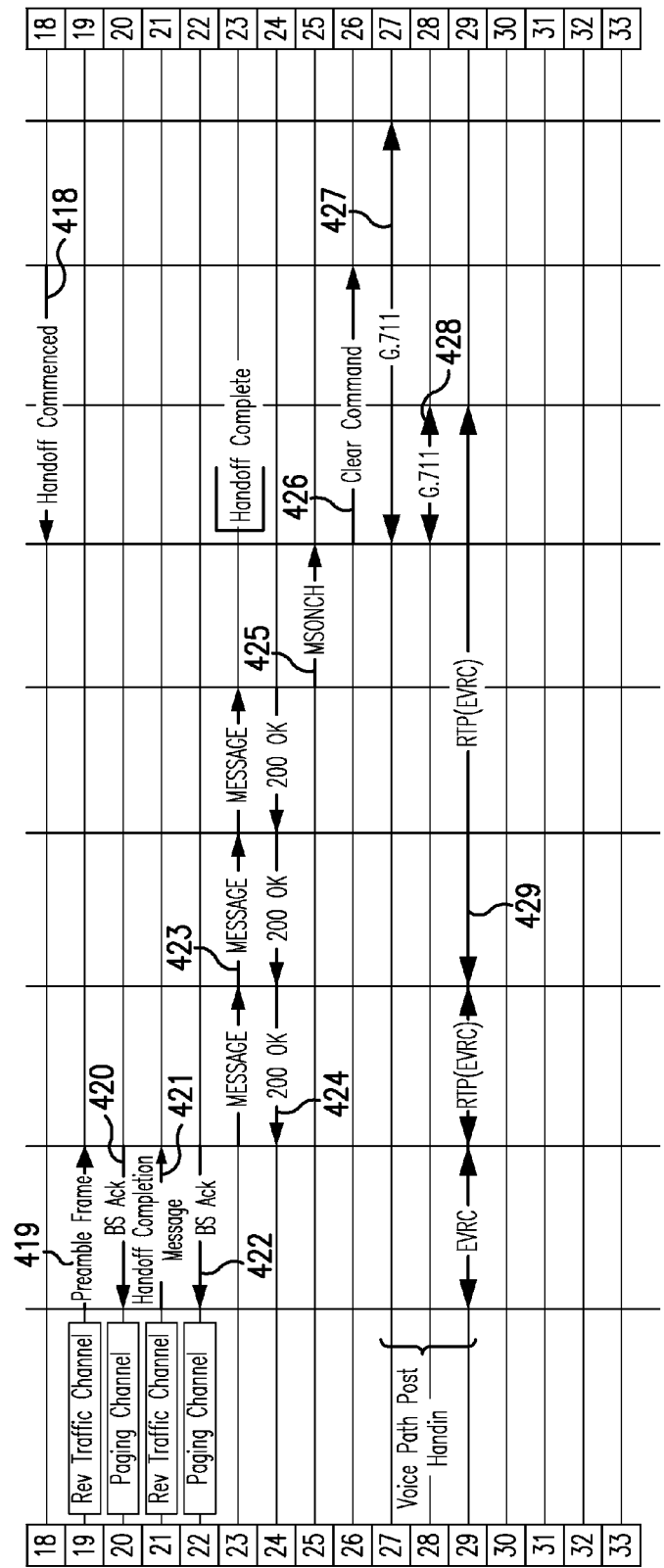

Referring now to FIGS. 4A and 4B, a message sequence for an active mode macrocell to residential femtocell handoff according to particular embodiments is illustrated. Prior to the start of the message sequence of FIG. 4, mobile subscriber "A" has established an active call with a PSTN user "B". Double-ended arrow #1 401 illustrates a voice path between user B and macrocell mobile switching center (MSC) 306; double-ended arrow #2 402 illustrates a voice path between MSC 306 and macrocell base transceiver station (BTS) 310; and double-ended arrow #3 403 illustrates a voice path between BTS 310 and mobile user station (MUS) 308, which is being used by mobile subscriber A. In exemplary embodiments, double-ended arrow #3 403 employs the Enhanced Variable Rate Codec (EVRC).

As mobile subscriber A moves near to the RF coverage area of a femtocell access point (FAP) 334, MUS 308 sends a "Candidate Frequency Search Report Message" (CFSRPM), i.e., message #4 404, over the reverse traffic channel to BTS 310 to indicate the strength of the candidate pilot signal(s). The pilot signal of FAP 334 is the strongest pilot signal.

The macrocell base station controller (BSC) 312 then detects that the Active Pilot Power-to-Interference Wave Power Ratio has dropped below a predetermined threshold. As a result, BTS 310 sends a "Handoff Required" message, which is message #5 405, and which contains a "Cell Identifier List" (i.e., a FAP Cell ID) to identify FAP 334, to MSC 306.

MSC 306 then reserves a circuit of the nailed-up TDM handoff trunk between MSC 306 and convergence server (CS) 322, and sends message #6 406, which is a "FACDIR2" IS-41 message, to CS 322. Message #6 406 directs CS 322 to initiate a "Handoff-Forward" task. Message #6 406 includes two key parameters: a "Target Cell ID," which is the FAP Cell ID for the target femtocell, and an "InterMSCCircuit ID," which is the Circuit Identifier Code (CIC) of the nailed-up TDM handoff trunk.

CS 322 then sends message #7 407, which is a "Reserve (CIC ID)" message, to media gateway control function (MGCF) 318. The purpose of message #7 407 is to obtain Session Description Protocol (SDP) information of the handoff circuit. MGCF 318 interacts with media gateway (MGW)

316 using the Megaco protocol to reserve the circuit. MGW 316 then sends a response containing the SDP of the reserved circuit to MGCF 318.

MGCF 318 then sends message #8 408, which is a "Response (SDP MGW)" message, to CS 322. The "Response" message #8 408 includes the SDP information for the reserved circuit. The "Reserve" message #7 407 and the "Response" message #8 408 are high-level conceptual messages which may be implemented using standard Session Initiation Protocol (SIP) messages such as "INVITE/200OK/ACK," "INFO/200OK," "MESSAGE/200OK," or any other proprietary mechanisms. Any implementation which enables the CIC ID and SDP MGW information to be conveyed may be used. The "Reserve" message #7 407 and the "Response" message #8 408 can be communicated directly between CS 322 to MGCF 318, or these messages can be communicated through the IMS core via S-CSCF 324 and BGCF 320.

CS 322 then sends a multi-part "SIP MESSAGE," which is message #9 409, to FAP 334 to request the FAP 334 to prepare for handoff. This message encapsulates a "Handoff Request" with the FAP Cell ID and the SDP MGW information, which is the SDP information for the reserved circuit. In exemplary embodiments, message #9 409 does not include a "SIP INVITE" message, because the use of an "SIP INVITE" message increases handoff setup time by requiring the exchange of at least four messages (i.e., an INVITE message, a 180 Ringing message, a 200OK message, and an ACK message) between CS 322 and FAP 334. This, in turn, may cause a race condition to occur, which may induce timing errors and thereby cause handoff failure. After receiving message #9 409, FAP 334 allocates necessary radio link and SDP resources (i.e., SDP FAP) for handoff, and prepares for radio channel switchover by sending forward traffic null frames (i.e., message #10 410) to MUS 308. Then, in response to the handoff request message #9 409, FAP 334 sends message #11 411 to CS 322. Message #11 411 is a multi-part "200OK" response encapsulating a "Handoff Request Acknowledgement" and the SDP FAP information.

CS 322 then sends an "Update (CIC: n, SDP FAP)" request, i.e., message #12 412, to MGCF 318 to inform MGCF 318 and MGW 316 of the SDP FAP information. MGCF 318 then sends message #13 413, a "Response (OK)" message, to CS 322 to acknowledge the "Update" request. The "Update" message and the "Response" message are high-level conceptual messages and can be implemented, for example, by using "SIP MESSAGE/200OK," "SIP UPDATE/200OK," "SIP re-INVITE/200OK/ACK," or any other suitable mechanism which accomplishes the objective of enabling the FAP and the MGW to exchange SDP information in order to establish a Real-time Transport Protocol (RTP) voice path between the FAP and the MGW.

CS 322 then sends a "FACDIR RETURN RESULT" message, i.e., message #14 414, to the macrocell MSC 306. This message informs the MSC that the necessary SDP information has been exchanged between the FAP and the MGW.

MSC 306 sends message #15 415, a "Handoff Command" message, to BTS 310 and BSC 312 to commence the source cell handoff procedure. Then, BTS 310 sends a "Universal Handoff Direction" message (UHDM) (i.e., message #16 416) to MUS 308, thereby directing MUS 308 to hand off to the femtocell network. MUS 308 acknowledges receipt of the UHDM by sending message #17 417, an "MS ACK" message, to BTS 310. After receiving the acknowledgement in message #17 417, BTS 310 sends a "Handoff Commenced" message (i.e., message #18 418) to MSC 306 to indicate that the handoff command has been sent to the mobile station and that an acknowledgement has been received from the mobile station.

MUS 308 then switches to the new CDMA frequency channel and frame offset associated with FAP 334. MUS 308 begins sending preamble frames, i.e., message #19 419, to FAP 334 on a reverse traffic channel. Upon receiving preamble frames in message #19 419, FAP 334 acknowledges receipt by sending a "BS ACK" message, i.e., message #20 420, to MUS 308.

MUS 308 then sends message #21 421, which is a "Handoff Completion" message, to FAP 334, and FAP 334 acknowledges by sending a "BS ACK" message, i.e., message #22 422, to MUS 308. FAP 334 then sends a SIP MESSAGE encapsulating a Handoff Complete message, i.e., message #23 423, to CS 322 to indicate that MUS 308 has successfully performed a handoff. Alternatively, message #23 423 may be a "SIP INFO" message. CS 322 then sends message #24 424, a "200OK" message, to FAP 334 to acknowledge receipt of message #23 423.

CS 322 then sends a "MSONCH" IS-41 message, i.e., message #25 425, to MSC 306 to indicate a successful hard handoff. MSC 306 then sends a "Clear Command" message, i.e., message #26 426, to BTS 310 and BSC 412 to instruct BSC 412 to release all service option connections to MUS 308 and the associated dedicated resource.

Mobile subscriber "A" continues to communicate on the same active call with PSTN user "B" after successful handoff completion. Double-ended arrow #27 427 illustrates a voice path between user B and MSC 306; double-ended arrow #28 428 illustrates a voice path between MSC 306 and MGW 316; and double-ended arrow #29 429 illustrates a voice path between MGW 316 and MUS 308 via FAP 334. In exemplary embodiments, message #29 429 employs the Enhanced Variable Rate Codec (EVRC).

Figure 5:
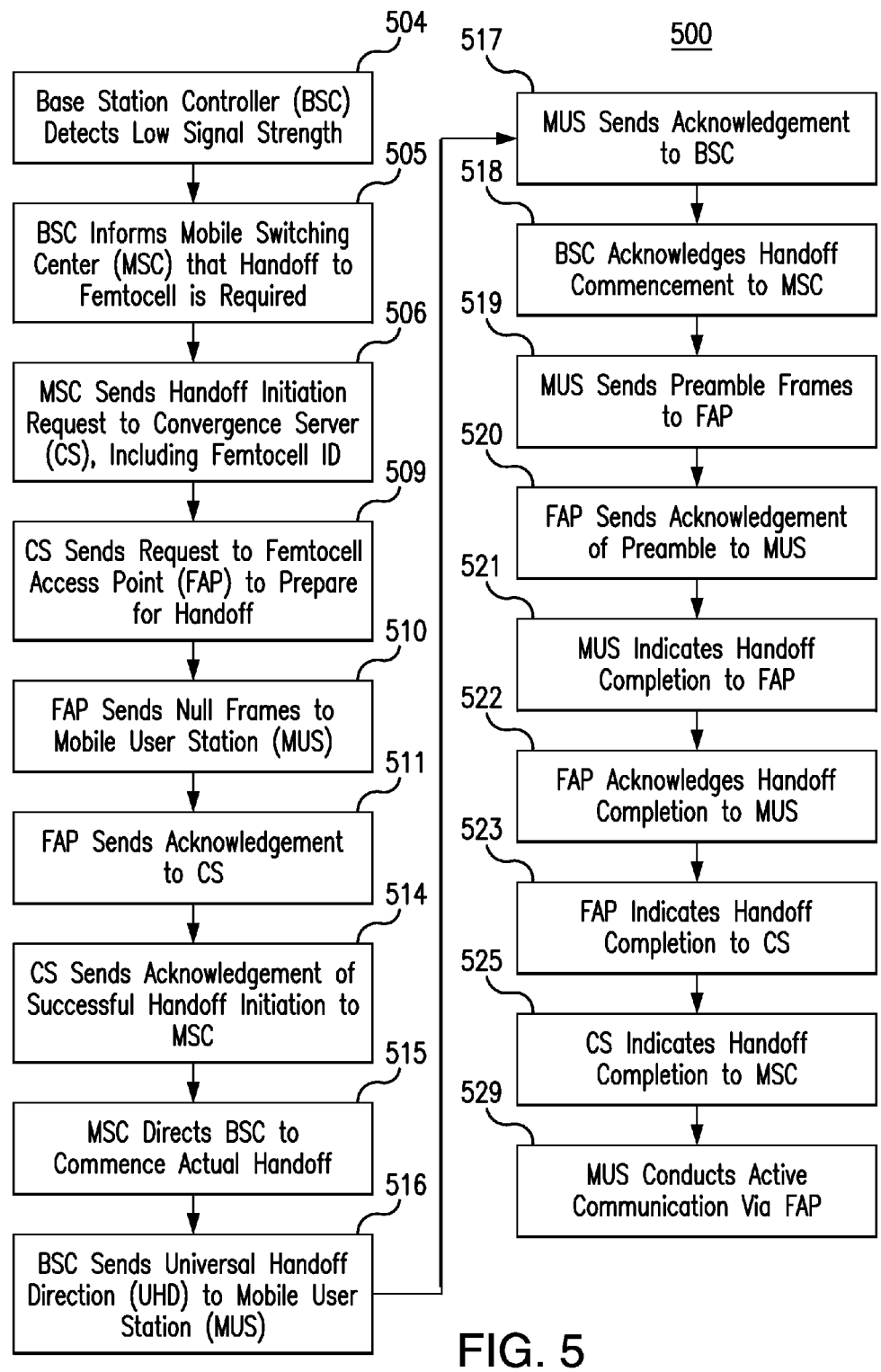
FIGS. 5, 5A, 5B, and 5C are flow charts illustrating a method for performing an active mode macrocell to residential femtocell handoff according to particular embodiments.

Referring now to FIG. 5, a flowchart 500 illustrates a method for handing off an active communication connection from a macrocell to a residential femtocell, in accordance with particular embodiments. In the first step 504, the macrocell base station controller (BSC) detects that the Active Pilot Power-to-Interference Wave Power Ratio associated with a mobile user station (MUS) on an active call has dropped below a predetermined threshold. As a result, at step 505, the BSC controls the base station transceiver (BTS) to send a message (e.g., message #5 405, a "Handoff Required" message) to the macrocell mobile switching center (MSC), to inform the MSC that a handoff to a femtocell is required.

Upon being informed of the need for a handoff to a femtocell, at step 506, the MSC sends a handoff initiation request (e.g., message #6 406) to the convergence server (CS). The handoff initiation request includes identification information to identify the femtocell to which the connection will be handed off. Then, in step 509, the CS sends a request (e.g., message #9 409) to the femtocell access point (FAP) corresponding to the identified femtocell to request that the FAP prepare to receive a handoff.

In step 510, the FAP begins handoff preparation by sending null frames (e.g., message #10 410) to the MUS, and then, in step 511, the FAP acknowledges the handoff preparation request by sending an acknowledgement message (e.g., message #11 411) to the CS. Upon receipt of this acknowledgment, the CS communicates with the media gateway (MGW) to exchange SDP information in order to establish a Real-time Transport Protocol (RTP) voice path between the FAP and the MGW. Then, in step 514, the CS acknowledges a successful handoff initiation by sending a message (e.g., message #14 414) to the MSC.

The MSC then directs the BSC to commence the actual handoff in step 515. This direction may be accomplished, for example, by the transmission of message #15 415. In response to receipt of this direction, at step 516, the BSC controls the BTS to send a UHD message (e.g., message #16 416) to the MUS, and the MUS acknowledges receipt of the UHD message (e.g., by sending message #17 417) in step 517. The BSC, in turn, acknowledges handoff commencement in step 518 by sending an acknowledgment message, e.g., message #18 418, to the MSC.

The MUS then sends preamble frames to the FAP (e.g., message #19 419) on a reverse traffic channel in step 519, and the FAP acknowledges receipt of the preamble frames (e.g., message #20 420) in step 520. Then, in step 521, the MUS indicates that the handoff has been completed by sending a message (e.g., message #21 421) to the FAP, and the FAP acknowledges handoff completion to the MUS (e.g., message #22 422) in step 522.

At step 523, the FAP indicates to the CS that the handoff is complete by sending a message (e.g., message #23 423), and then, at step 525, the CS indicates handoff completion by sending a message (e.g., message #25 425) to the MSC. Finally, in step 529, the MUS continues to conduct the active communication via the FAP.

Figure 5A:
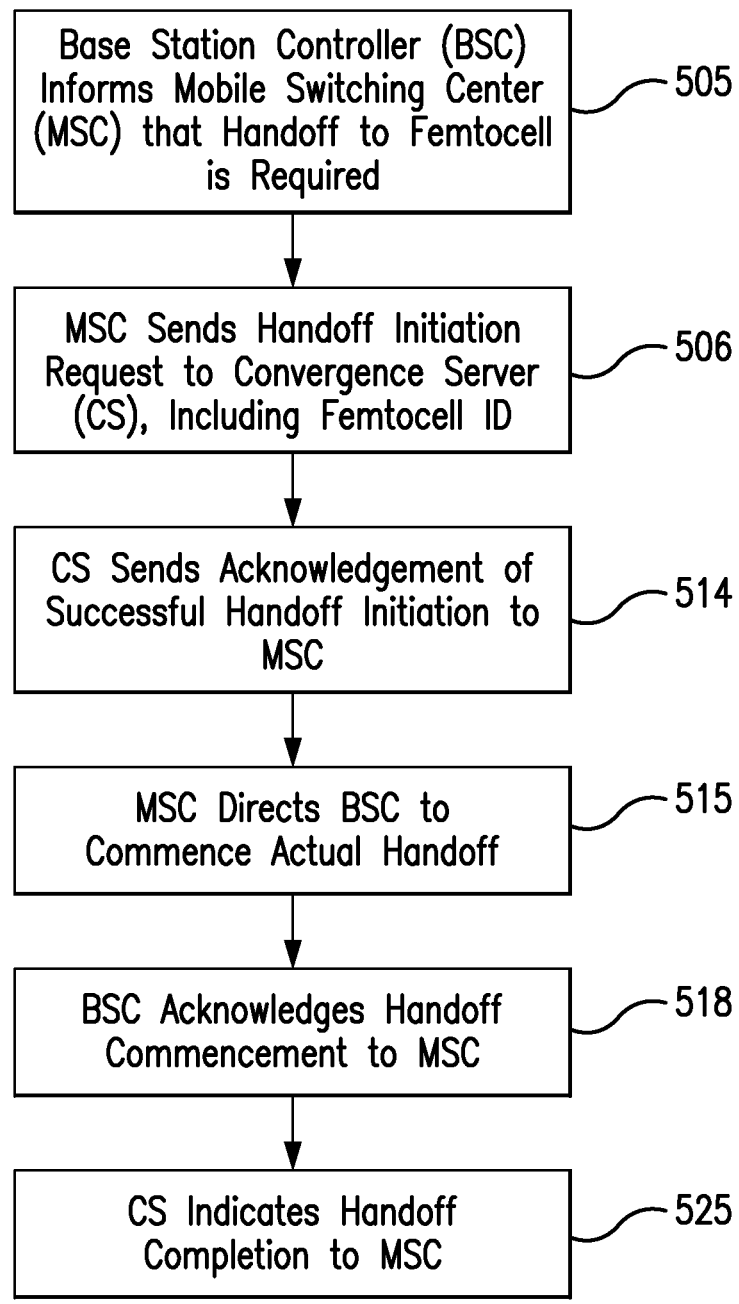
Figure 5B:
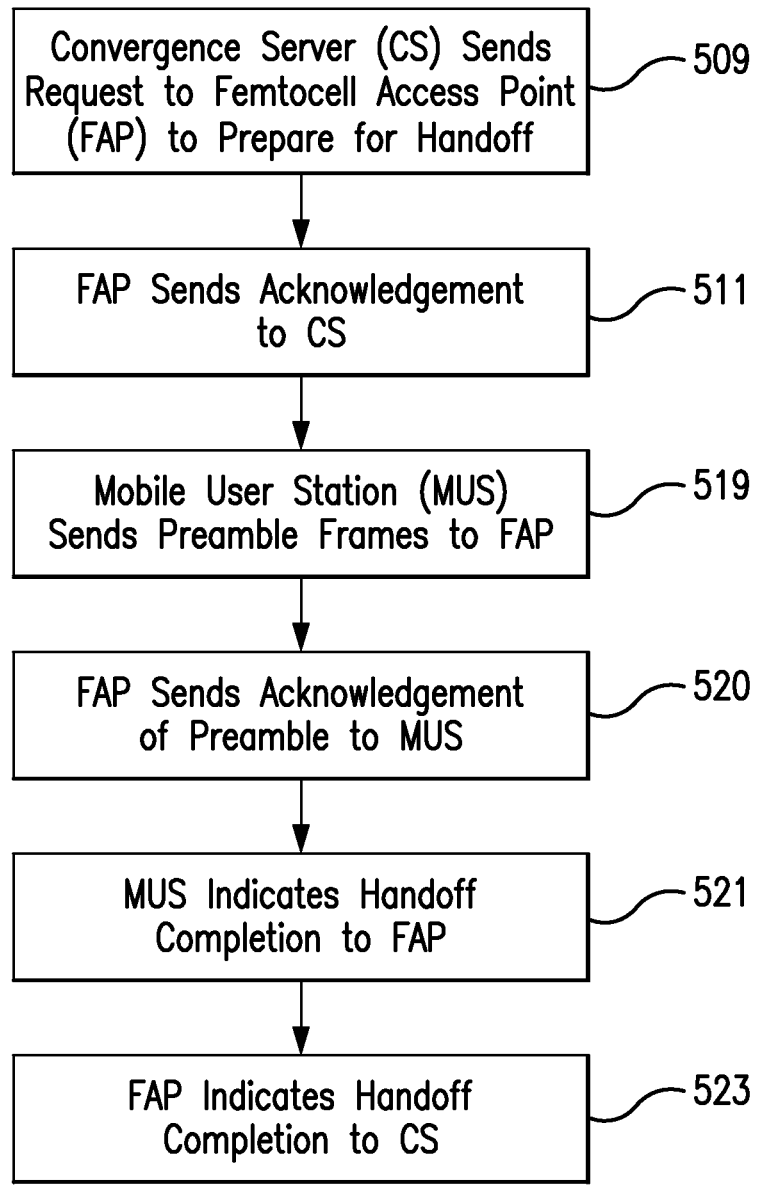
Figure 5C:
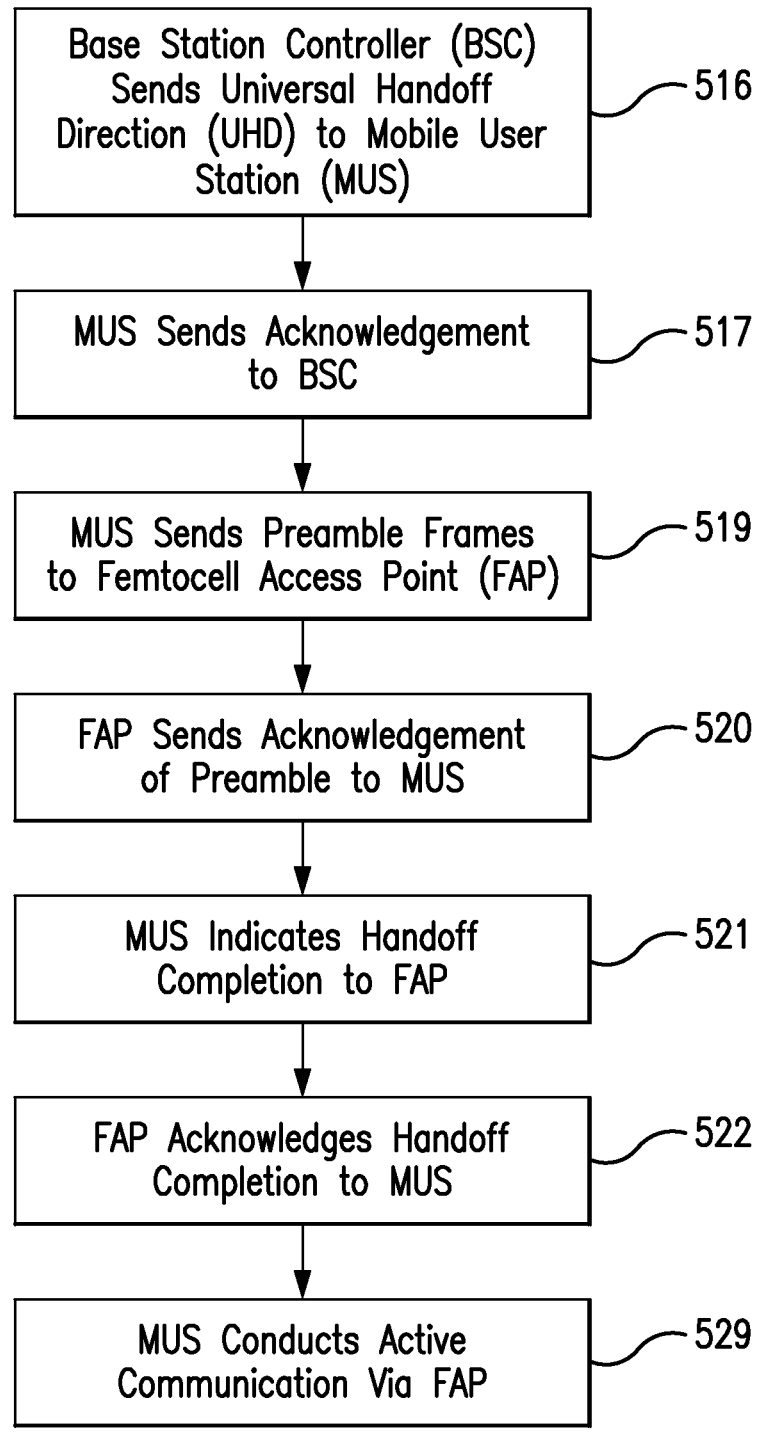

Referring now to FIGS. 5A, 5B, and 5C, each flowchart illustrates a subset of the steps performed as part of the method 500 by respective entities for handing off an active communication connection from a macrocell to a residential femtocell. In particular, FIG. 5A is a flowchart that includes the steps performed by the MSC 306; FIG. 5B is a flowchart that includes the steps performed by the FAP 334; and FIG. 5C is a flowchart that includes the steps performed by the MUS 308.

Figure 6A:
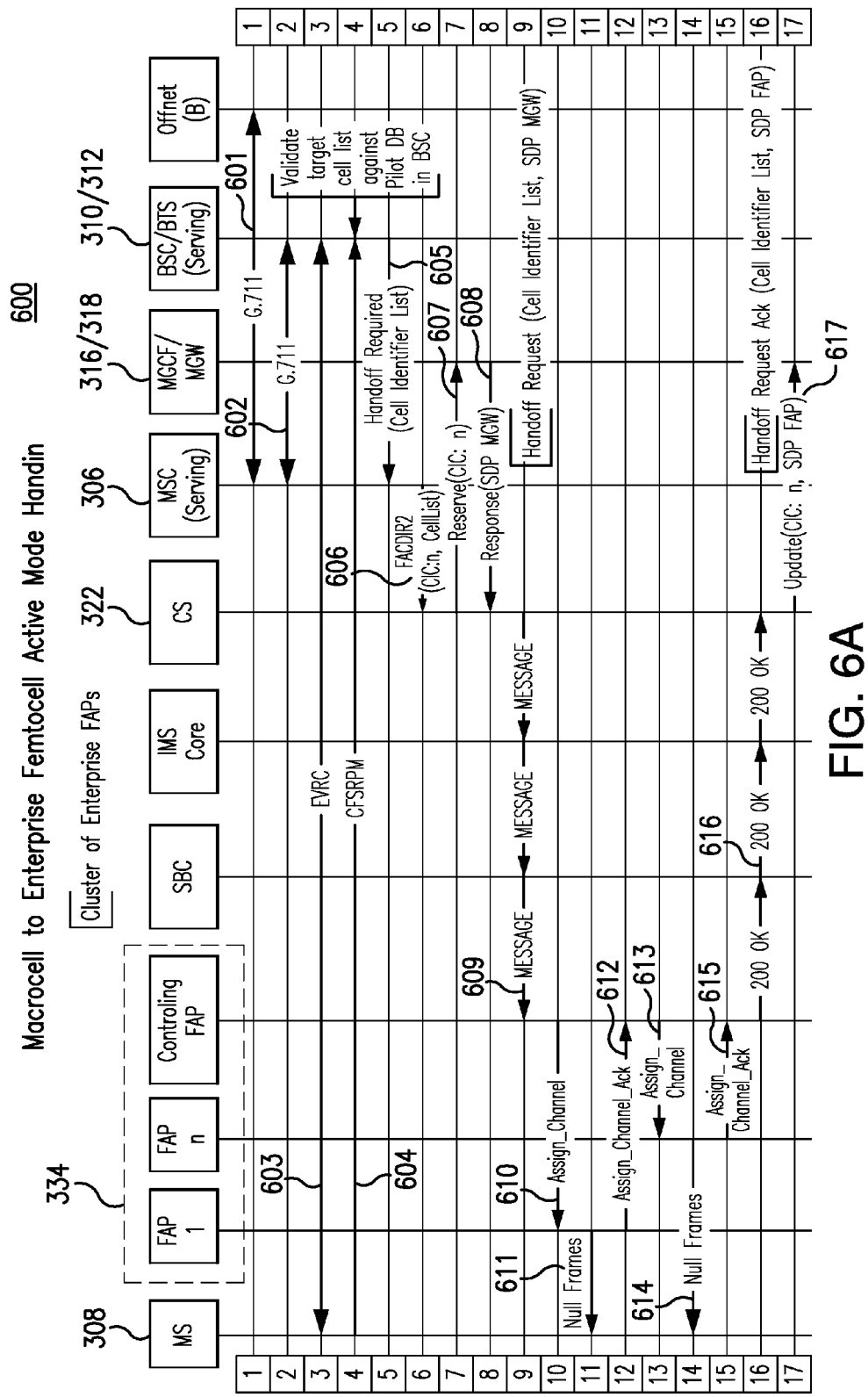
FIGS. 6A and 6B illustrate an active mode macrocell to enterprise femtocell handoff message sequence according to particular embodiments.
Figure 6B:
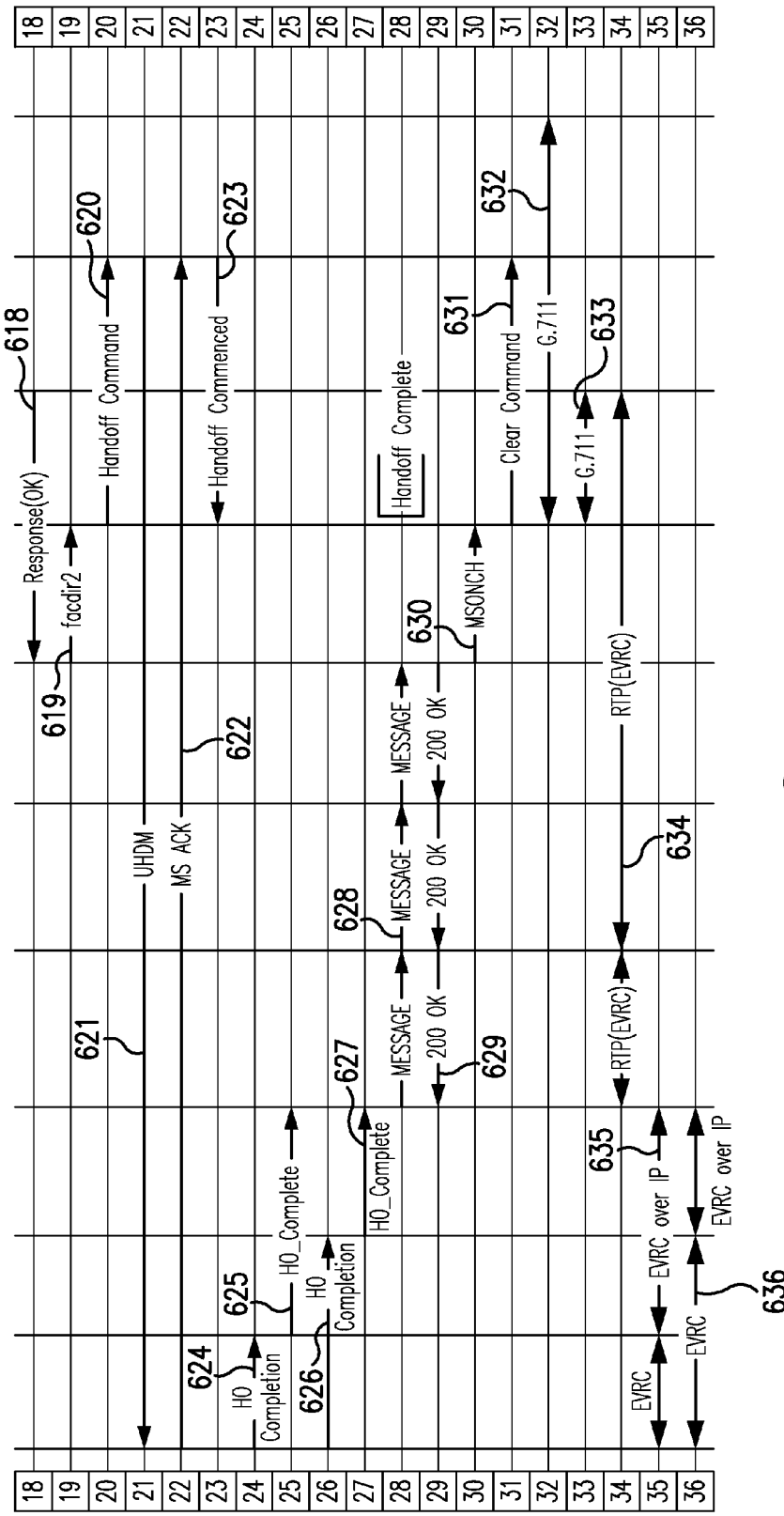

Referring now to FIGS. 6A and 6B, a message sequence for an active mode macrocell-to-enterprise-femtocells handoff according to particular embodiments is illustrated. In this scenario, the enterprise femtocells include a cluster of femtocells. Prior to the start of the message sequence of FIG. 6, mobile subscriber "A" has established an active call with a PSTN user "B". Double-ended arrow #1 601 illustrates a voice path between user B and macrocell mobile switching center (MSC) 306; double-ended arrow #2 602 illustrates a voice path between MSC 306 and macrocell base transceiver station (BTS) 310; and double-ended arrow #3 603 illustrates a voice path between BTS 310 and mobile user station (MUS) 308, which is being used by mobile subscriber A. In exemplary embodiments, message #3 603 employs the Enhanced Variable Rate Codec (EVRC).

As mobile subscriber A moves near to the RF coverage area of a cluster of femtocell access points (FAP) 334, MUS 308 sends a "Candidate Frequency Search Report Message" (CFSRPM), i.e., message #4 604, over the reverse traffic channel to BTS 310 to indicate the strength of the candidate pilot signal(s). The pilot signal of FAP 1 and FAP n are the strongest pilot signals.

The macrocell base station controller (BSC) 312 then detects that the Active Pilot Power-to-Interference Wave Power Ratio has dropped below a predetermined threshold. As a result, BTS 310 sends a "Handoff Required" message, which is message #5 605, and which contains a "Cell Identifier List" (i.e., FAP 1 Cell ID and FAP n Cell ID) to identify cluster FAP 334, to MSC 306.

MSC 306 then reserves a circuit of the nailed-up TDM handoff trunk between MSC 306 and convergence server (CS) 322, and sends message #6 606, which is a "FACDIR2" IS-41 message, to CS 322. Message #6 606 directs CS 322 to initiate a "Handoff-Forward" task. Message #6 606 includes two key parameters: a "Target Cell List," which includes the FAP 1 Cell ID and FAP n Cell ID for the target femtocell cluster, and an "InterMSCCircuit ID," which is the Circuit Identifier Code (CIC) of the nailed-up TDM handoff trunk.

CS 322 then sends message #7 607, which is a "Reserve (CIC ID)" message, to media gateway control function (MGCF) 318. The purpose of message #7 607 is to obtain Session Description Protocol (SDP) information of the handoff circuit. MGCF 318 interacts with media gateway (MGW) 316 using the Megaco protocol to reserve the circuit. MGW 316 then sends a response containing the SDP of the reserved circuit to MGCF 318.

MGCF 318 then sends message #8 608, which is a "Response (SDP MGW)" message, to CS 322. The "Response" message #8 608 includes the SDP information for the reserved circuit. The "Reserve" message #7 607 and the "Response" message #8 608 are high-level conceptual messages which may be implemented using standard Session Initiation Protocol (SIP) messages such as "INVITE/200OK/ACK," "INFO/200OK," "MESSAGE/200OK," or any other proprietary mechanisms. Any implementation which enables the CIC ID and SDP MGW information to be conveyed may be used. The "Reserve" message #7 607 and the "Response" message #8 608 can be communicated directly between CS 322 to MGCF 318, or these messages can be communicated through the IMS core via S-CSCF 324 and BGCF 320.

CS 322 accesses its cell database to determine that FAP 1 and FAP n are located in a cluster FAP 334 which is controlled by a Controlling FAP. CS 322 then sends a multi-part "SIP MESSAGE," which is message #9 609, to the Controlling FAP within FAP 334 to request the Controlling FAP to prepare for handoff. This message encapsulates a "Handoff Request" with the FAP 1 Cell ID, the FAP n Cell ID, and the SDP MGW information, which is the SDP information for the reserved circuit. In exemplary embodiments, message #9 609 does not include a "SIP INVITE" message, because the use of an "SIP INVITE" message may cause a race condition to occur, which may induce timing errors and thereby cause handoff failure. After receiving message #9 609, the Controlling FAP of FAP 334 allocates necessary radio link and SDP resources (i.e., SDP FAP) for handoff, and sends an "Allocate_Channel" message, i.e., message #10 610, to FAP 1 over a local enterprise IP backbone to request that FAP 1 allocate radio resources.

FAP 1 prepares for radio channel switchover by sending forward traffic null frames (i.e., message #11 611) to MUS 308. Then, in response to the "Allocate_Channel" message #10 610, FAP 1 sends an acknowledgement message, i.e., message #12 612, to the Controlling FAP to indicate a successful radio resource allocation. The Controlling FAP then interacts with FAP n similarly as with FAP 1 by sending an "Allocate_Channel" message, i.e., message #13 613, to FAP n over a local enterprise IP backbone to request that FAP n allocate radio resources. FAP n prepares for radio channel switchover by sending forward traffic null frames (i.e., message #14 614) to MUS 308. Then, in response to the "Allocate_Channel" message #13 613, FAP n sends an acknowledgement message, i.e., message #15 615, to the Controlling FAP to indicate a successful radio resource allocation.

Upon receiving message #12 612 and message #15 615 indicating successful radio resource allocations from FAP 1 and FAP n, respectively, and in response to handoff request message #9 609, the Controlling FAP sends message #16 616 to CS 322. Message #16 616 is a multi-part "200OK" response encapsulating a "Handoff Request Acknowledgement" and the SDP CFAP information.

CS 322 then sends an "Update (CIC: n, SDP FAP)" request, i.e., message #17 617, to MGCF 318 to inform MGCF 318 and MGW 316 of the SDP FAP information. MGCF 318 then sends message #18 618, a "Response (OK)" message, to CS 322 to acknowledge the "Update" request. The "Update" message and the "Response" message are high-level conceptual messages and can be implemented, for example, by using "SIP MESSAGE/200OK," "SIP UPDATE/200OK," "SIP re-INVITE/200OK/ACK," or any other suitable mechanism which accomplishes the objective of enabling the FAP and the MGW to exchange SDP information in order to establish a Real-time Transport Protocol (RTP) voice path between the FAP and the MGW.

CS 322 then sends a "FACDIR RETURN RESULT" message, i.e., message #19 619, to the macrocell MSC 306. This message informs the MSC that the necessary SDP information has been exchanged between the FAP and the MGW.

MSC 306 sends message #20 620, a "Handoff Command" message, to BTS 310 and BSC 312 to commence the source cell handoff procedure. Then, BTS 310 sends a "Universal Handoff Direction" message (UHDM) (i.e., message #21 621) to MUS 308, thereby directing MUS 308 to hand off to the femtocell network. MUS 308 acknowledges receipt of the UHDM by sending message #22 622, an "MS ACK" message, to BTS 310. After receiving the acknowledgement in message #22 622, BTS 310 sends a "Handoff Commenced" message (i.e., message #23 623) to MSC 306 to indicate that the handoff command has been sent to the mobile station and that an acknowledgement has been received from the mobile station.

Then, MUS 308 actually switches to the new CDMA frequency channel and frame offset associated with FAP 1 within cluster FAP 334. MUS 308 begins sending preamble frames to FAP 1 on a reverse traffic channel. Upon receiving preamble frames, FAP 1 acknowledges receipt by sending a "BS ACK" message to MUS 308. MUS 308 then sends message #24 624, which is a "Handoff Completion" message, to FAP 1, and FAP 1 informs the Controlling FAP that the handoff has been completed by sending message #25 625. MUS 308 also sends message #26 626, another "Handoff Completion" message, to FAP n, and FAP n informs the Controlling FAP that the handoff has been completed by sending message #27 627.

The Controlling FAP then sends a SIP MESSAGE encapsulating a Handoff Complete message, i.e., message #28 628, to CS 322 to indicate that MUS 308 has successfully performed a handoff to the enterprise FAP cluster 334. Alternatively, message #28 628 may be a "SIP INFO" message. CS 322 then sends message #29 629, a "200OK" message, to the Controlling FAP to acknowledge receipt of message #28 628.

Then, CS 322 sends a "MSONCH" IS-41 message, i.e., message #30 630, to MSC 306 to indicate a successful hard handoff. MSC 306 then sends a "Clear Command" message, i.e., message #31 631, to BTS 310 and BSC 412 to instruct BSC 412 to release all service option connections to MUS 308 and the associated dedicated resource.

Mobile subscriber "A" continues to communicate on the same active call with PSTN user "B" after successful handoff completion. Double-ended arrow #32 632 illustrates a voice path between user B and MSC 306; double-ended arrow #33 633 illustrates a voice path between MSC 306 and MGW 316; and double-ended arrow #34 634 illustrates a voice path between MGW 316 and MUS 308 via FAP 334. Double-ended arrow #35 635 illustrates a voice path between MUS 308 and FAP 1, and double-ended arrow #36 626 illustrates a voice path between MUS 308 and FAP n.

Figure 7:
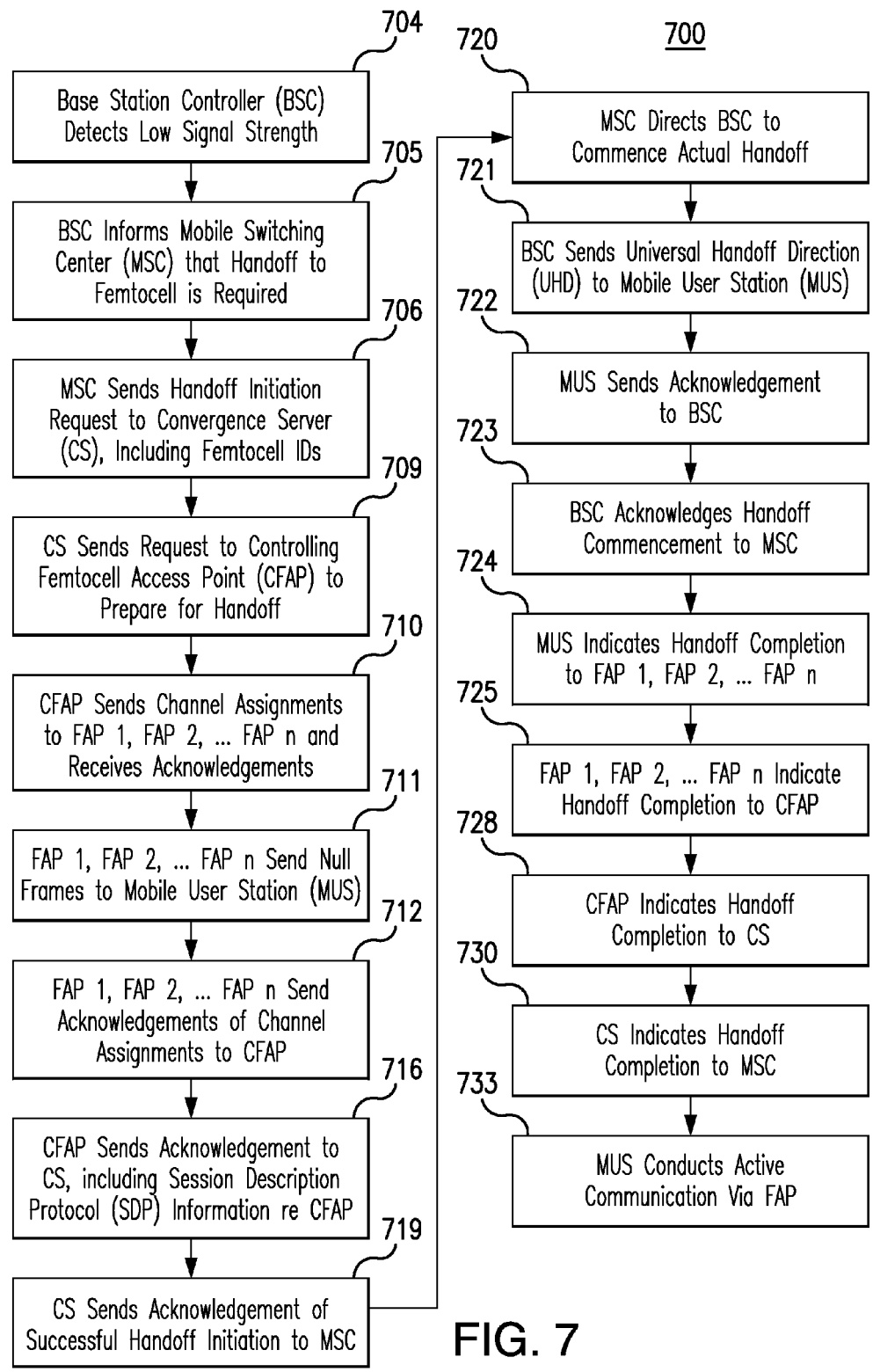
FIGS. 7, 7A, 7B, and 7C are flow charts illustrating a method for performing an active mode macrocell to enterprise femtocell handoff according to particular embodiments.

Referring now to FIG. 7, a flowchart 700 illustrates a method for handing off an active communication connection from a macrocell to a enterprise femtocell cluster, in accordance with particular embodiments. In the first step 704, the macrocell base station controller (BSC) detects that the Active Pilot Power-to-Interference Wave Power Ratio associated with a mobile user station (MUS) on an active call has dropped below a predetermined threshold. As a result, at step 705, the BSC controls the base station transceiver (BTS) to send a message (e.g., message #5 605, a "Handoff Required" message) to the macrocell mobile switching center (MSC), to inform the MSC that a handoff to a femtocell is required.

Upon being informed of the need for a handoff to a femtocell, at step 706, the MSC sends a handoff initiation request (e.g., message #6 606) to the convergence server (CS). The handoff initiation request includes identification information to identify the individual femtocell access points (FAPs) within the enterprise femtocell cluster to which the connection will be handed off. The identified individual femtocell access points may or may not include the controlling femtocell access point corresponding to the enterprise femtocell cluster. The CS uses the list of identified individual FAPs in conjunction with its cell database to determine the controlling FAP of the cluster. In step 709, the CS sends a request (e.g., message #9 609) to the controlling FAP to request that the controlling FAP prepare to receive a handoff.

In step 710, the controlling FAP begins handoff preparation by sending channel assignments to individual FAPs within the cluster (e.g., message #10 610 and message #13 613). In step 711, the respective individual FAPs send null frames (e.g., message #11 611 and message #14 614) to the MUS, and then, in step 712, the respective individual FAPs send acknowledgement messages (e.g., message #12 612 and message #15 615) to the controlling FAP to acknowledge the channel assignments. Then, in step 716, the controlling FAP acknowledges the handoff preparation request by sending an acknowledgement message (e.g., message #16 616) to the CS. This acknowledgement message includes Session Description Protocol (SDP) information pertaining to the controlling FAP, including IP address and port number of the controlling FAP.

Upon receipt of this acknowledgment, the CS communicates with the media gateway (MGW) to exchange SDP information (e.g., message #17 617 and message #18 618) in order to establish a Real-time Transport Protocol (RTP) voice path between the FAP and the MGW. Then, in step 519, the CS acknowledges a successful handoff initiation by sending a message (e.g., message #19 619) to the MSC.

The MSC then directs the BSC to commence the actual handoff in step 720. This direction may be accomplished, for example, by the transmission of message #20 620. In response to receipt of this direction, at step 721, the BSC controls the BTS to send a UHD message (e.g., message #21 621) to the MUS, and the MUS acknowledges receipt of the UHD message (e.g., by sending message #22 622) in step 722. The BSC, in turn, acknowledges handoff commencement in step 723 by sending an acknowledgment message, e.g., message #23 623, to the MSC.

The MUS then sends preamble frames to the individual FAPs within the enterprise femtocell cluster on a reverse traffic channel, and the individual FAPs respectively acknowledge receipt of the preamble frames. Then, in step 724, the MUS indicates that the handoff has been completed by sending messages (e.g., message #24 624 and message #26 626) to the respective individual FAPs, and the individual FAPs respectively acknowledge handoff completion to the controlling FAP (e.g., message #25 625 and message #27 627) in step 725.

At step 728, the controlling FAP indicates to the CS that the handoff is complete by sending a message (e.g., message #28 628), and then, at step 730 the CS indicates handoff completion by sending a message (e.g., message #30 630) to the MSC. Finally, in step 733, the MUS continues to conduct the active communication via the enterprise femtocell cluster. In the uplink direction, a voice frame "x" transmitted by the MUS is received by FAP 1 and FAP n, which then forward voice frame "x" to the controlling FAP. The controlling FAP selects the strongest received voice frame and forwards that voice frame to the MGW 316. In the downlink direction, the MGW transmits a voice frame "y" to the controlling FAP, which then forwards that same voice frame "y" to both FAP 1 and FAP n, each of which forward voice frame "y" to the MUS.

Figure 7A:
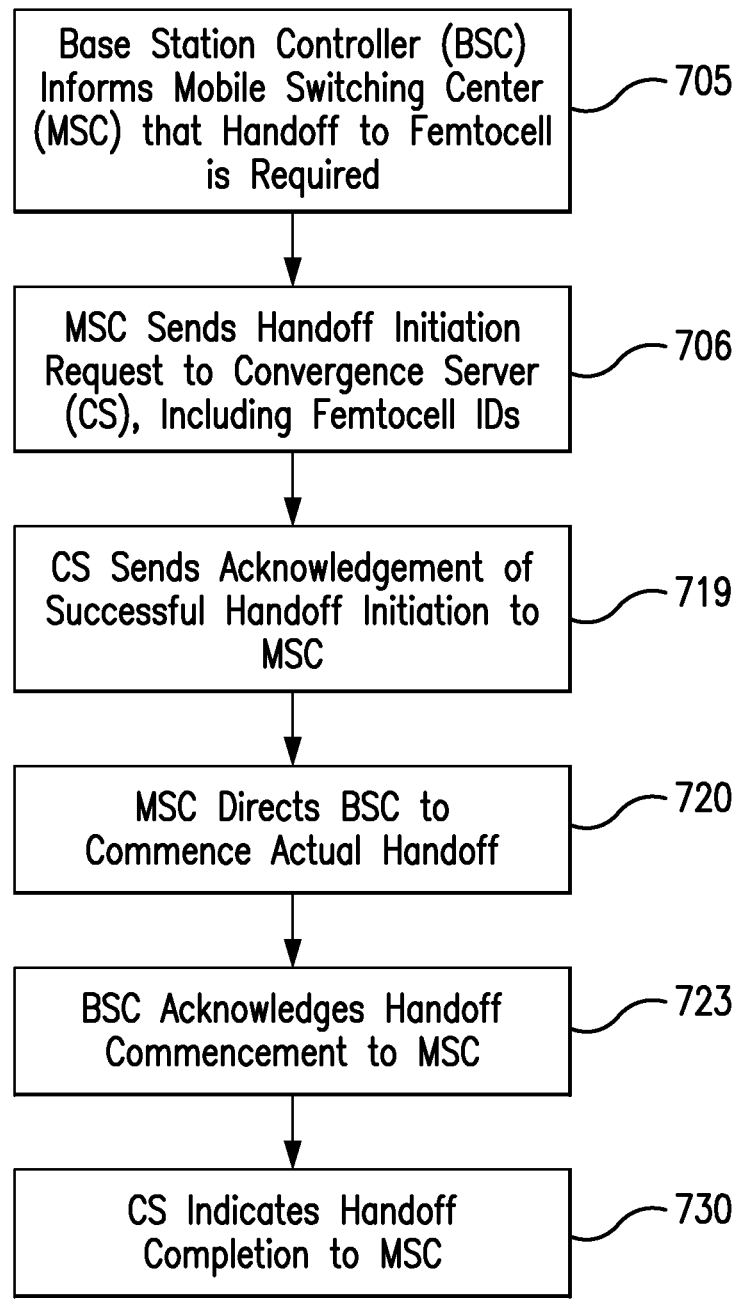
Figure 7B:
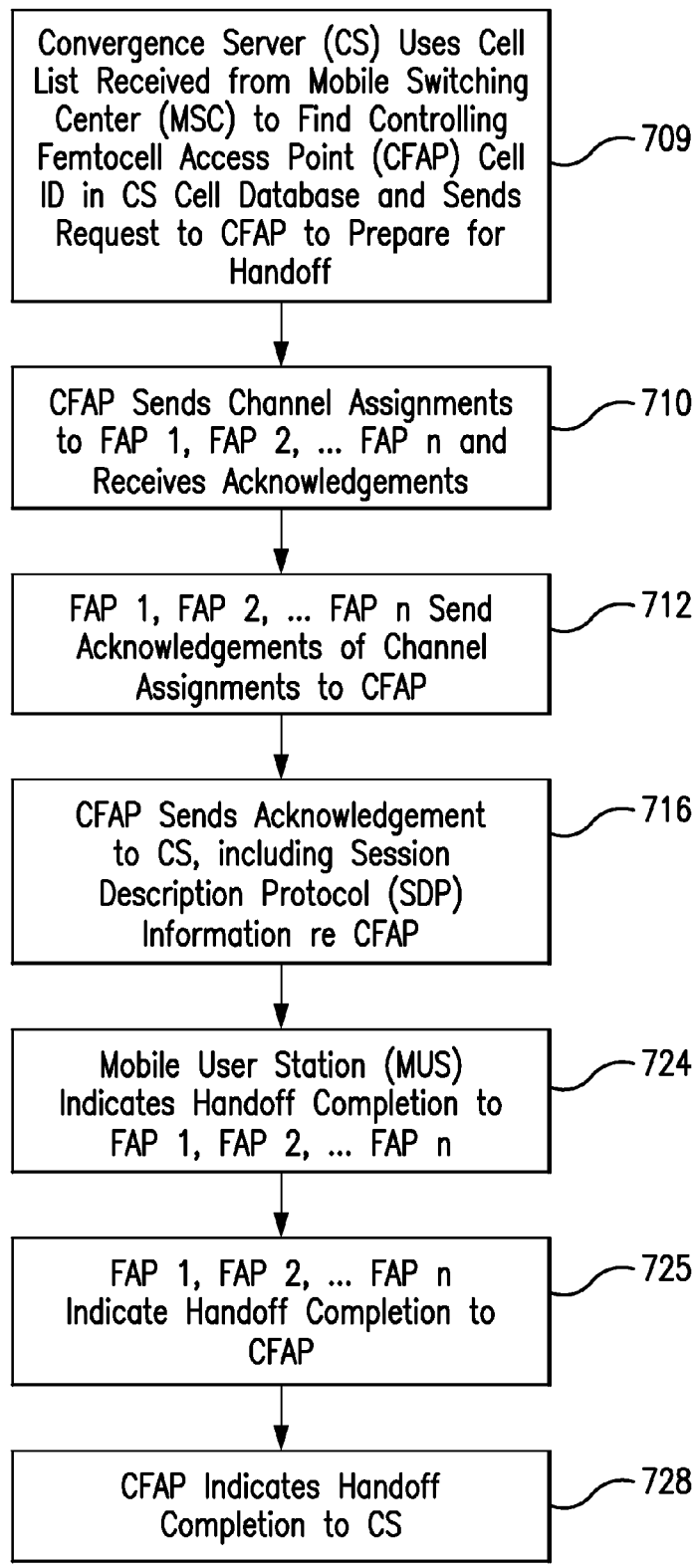
Figure 7C:
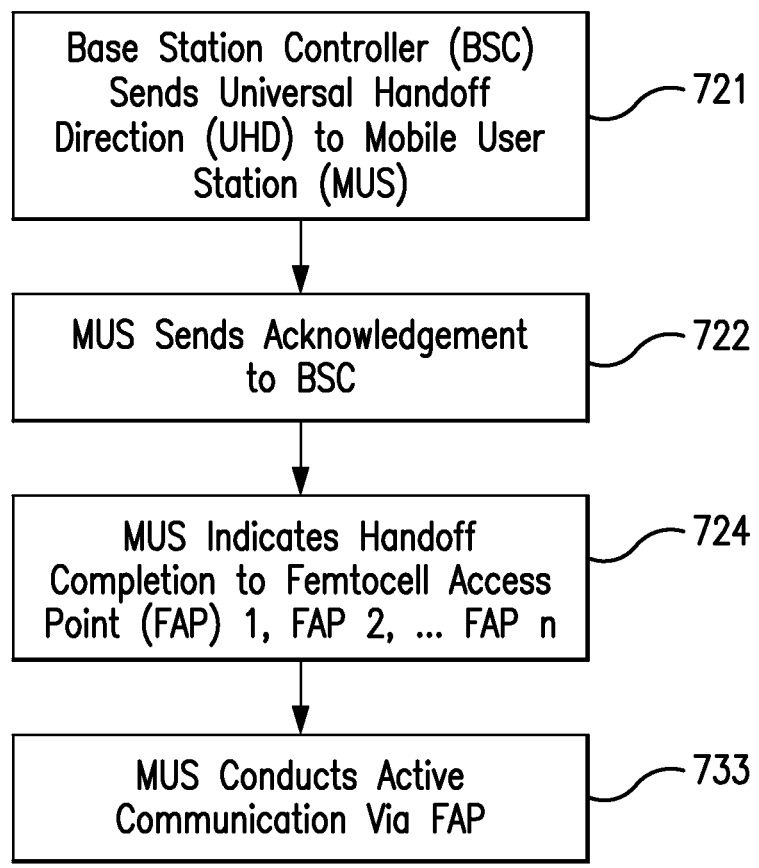

Referring now to FIGS. 7A, 7B, and 7C, each flowchart illustrates a subset of the steps performed as part of the method 700 by respective entities for handing off an active communication connection from a macrocell to a enterprise femtocell cluster. In particular, FIG. 7A is a flowchart that includes the steps performed by the MSC 306; FIG. 7B is a flowchart that includes the steps performed by the enterprise FAP 334; and FIG. 7C is a flowchart that includes the steps performed by the MUS 308.

While various embodiments have been described above, it should be understood that they have been presented by way of example only, and not limitation. Thus, the breadth and scope of the present disclosure should not be limited by any of the above-described exemplary embodiments. For example, although an exemplary embodiment that relates to voice communication has been described, the disclosure may be used for any type of communication, including voice, data, video, text, or any other communication service connecting two or more user agents. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A method for performing a handoff of an active communication connection for a mobile user station from a macrocell to a femtocell, the method comprising:
   (a) receiving, at a radio access control function (RACF) subsystem of a mobile switching center corresponding to the macrocell, a first message transmitted from a base station controller corresponding to the macrocell, the first message including an indication that the active communication connection should be handed off to a femtocell access point corresponding to the femtocell;
   (b) generating and transmitting a second message from the RACF subsystem to a target convergence server, the second message including instructions for initiating the handoff;
   (c) receiving a third message at the RACF subsystem from the target convergence server, the third message including an indication that the handoff has been successfully initiated;
   (d) generating and transmitting a fourth message from the RACF subsystem to the base station controller, the fourth message including a direction to the base station controller to commence the handoff;
   (e) receiving a fifth message at the RACF subsystem from the base station controller after the base station controller receives an acknowledgement message to a Universal Handoff Direction message sent to the mobile user station, the fifth message including a handoff commencement acknowledgement;
   (f) receiving a sixth message at the RACF subsystem from the target convergence server, the sixth message including an indication of a completion of a successful handoff; and
   (g) upon completion of the successful handoff, a trunking subsystem of the mobile switching center provides a connection between a public switched telephone network (PSTN) and the femtocell access point, the RACF subsystem transmitting a seventh message to a call control function (CCF) subsystem of the mobile switching center, the seventh message including an indication that the mobile user station is communicating with the mobile switching center via a nailed-up trunk.

2. The method of claim 1, wherein the handoff is completed without a transmission of a Session Initiation Protocol (SIP) INVITE message between the target convergence server and the femtocell access point.

3. The method of claim 1, wherein the receiving of the first message further comprises receiving the first message after the base station controller determines that a signal strength corresponding to the mobile user station is less than a predetermined threshold.

4. The method of claim 1, wherein, after the second message has been transmitted, the third message is received after the target convergence server has transmitted a request message to the femtocell access point that includes a request that the femtocell access point prepare for handoff and the femtocell access point has transmitted an acknowledgement message to the target convergence server.

5. The method of claim 4, wherein the third message is received without a transmission of an additional acknowledgement message from the target convergence server to the femtocell access point.

6. The method of claim 1, wherein, after the fifth message has been received, the sixth message is received after the femtocell access point (a) receives a first handoff completion message from the mobile user station and (b) transmits a second handoff completion message to the target convergence server.

7. The method of claim 1, wherein the second message includes a femtocell identification and a Circuit Identifier Code (CIC) corresponding to a handoff trunk communication channel between the mobile switching center and a media gateway station, the media gateway station being in communication with the femtocell access point.

8. A method for performing a handoff of an active communication connection for a mobile user station from a macrocell to a femtocell, the method comprising:
   (a) receiving, at a femtocell access point corresponding to the femtocell, a first message transmitted from a convergence server, the first message including a request to initiate a handoff from a base station controller corresponding to the macrocell;
   (b) transmitting a second message to the convergence server, the second message including an acknowledgement of a receipt of the first message;
   (c) receiving from the mobile user station a third message after the base station controller receives an acknowledgement message to a Universal Handoff Direction message sent to the mobile user station, the third message including a preamble message;

(d) transmitting a fourth message to the mobile user station, the fourth message including an acknowledgement of a receipt of the preamble message;

(e) receiving from the mobile user station a fifth message, the fifth message including an indication of a completion of the handoff; and (f) transmitting a sixth message to the convergence server, the sixth message including an indication of a successful completion of the handoff;

wherein, upon the successful completion of the handoff, a trunking subsystem of a mobile switching center provides a connection between a public switched telephone network (PSTN) and the femtocell access point, a radio access control function (RACF) subsystem of the mobile switching center providing an indication to a call control function (CCF) subsystem of the mobile switching center that the mobile user station is communicating with the mobile switching center via a nailed-up trunk.

9. The method of claim 8, wherein the handoff is completed without a transmission of a Session Initiation Protocol (SIP) INVITE message between the convergence server and the femtocell access point.

10. The method of claim 8, wherein the step of receiving the first message comprises receiving the first message after the base station controller determines that a signal strength corresponding to the mobile user station is less than a predetermined threshold.

11. The method of claim 8, wherein after the second message is transmitted, the third message is received without a transmission of an additional acknowledgement message from the target convergence server to the femtocell access point.

12. A method for performing a handoff of an active communication connection for a mobile user station from a macrocell to a femtocell, the method comprising:

(a) receiving, at the mobile user station, a first message transmitted from a base station controller corresponding to the macrocell, the first message including a Universal Handoff Direction message;

(b) transmitting a second message to the base station controller, the second message including an acknowledgement of a receipt of the Universal Handoff Direction message;

(c) transmitting a third message to a femtocell access point corresponding to the femtocell, the third message including at least one preamble frame;

(d) receiving a fourth message from the femtocell access point, the fourth message including an acknowledgement of a receipt of the at least one preamble frame;

(e) transmitting a fifth message to the femtocell access point, the fifth message including an indication of a completion of the handoff;

(f) receiving a sixth message from the femtocell access point, the sixth message including an acknowledgement of a completion of the handoff, wherein, upon the completion of the handoff, a trunking subsystem of a mobile switching center provides the active communication connection between a public switched telephone network (PSTN) and the femtocell access point, a radio access control function (RACF) subsystem of the mobile switching center providing an indication to a call control function (CCF) subsystem of the mobile switching center that the mobile user station is communicating with the mobile switching center via a nailed-up trunk; and (g) communicating on the active communication connection via the femtocell access point.

13. The method of claim 12, wherein the handoff is completed without a transmission or reception of a Session Initiation Protocol (SIP) INVITE message by the femtocell access point.

14. The method of claim 12, wherein the receiving of the first message further comprises receiving the first message after the base station controller determines that a signal strength corresponding to the mobile user station is less than a predetermined threshold.

15. The method of claim 12, further comprising receiving at least one null frame from the femtocell access point prior to receiving the first message, wherein the receiving at least one null frame occurs after the femtocell access point has received a request to initiate the handoff.

16. The method of claim 15, wherein prior to receiving the at least one null frame, the femtocell access point receives a handoff request message from a convergence server, and after receiving the at least one null frame, the femtocell access point transmits a message to the convergence server that includes an acknowledgement of a receipt of the handoff request message without receiving a further acknowledgement message from the convergence server prior to the mobile user station receiving the first message.

17. The method of claim 12, wherein after the sixth message is received, the femtocell access point transmits a seventh message to a convergence server that includes an indication that the handoff has been successfully completed prior to the mobile user station communicating on the active communication connection via the femtocell access point.

18. A mobile switching station for performing a handoff of an active communication connection for a mobile user station from a macrocell to a femtocell, comprising:

a radio access control function (RACF) subsystem in communication with the mobile user station via a base station controller corresponding to the macrocell and in communication with a target convergence server;

a call control function (CCF) subsystem in communication with the RACF subsystem; and a trunking subsystem in communication with the RACF subsystem and with a public switched telephone network (PSTN), wherein when the mobile user station moves to within a predetermined range with respect to the femtocell, the RACF subsystem is configured to receive a first message transmitted from the base station controller, the first message including an indication that the active communication connection should be handed off to a femtocell access point corresponding to the femtocell;

wherein the RACF subsystem is configured to generate a second message, the second message including instructions for initiating the handoff;

wherein the RACF subsystem is further configured to transmit the second message to the target convergence server and to receive a third message from the target convergence server, the third message including an indication that the handoff has been successfully initiated;

wherein the RACF subsystem is further configured to generate a fourth message, the fourth message including a direction to commence the handoff;

wherein the RACF subsystem is further configured to transmit the fourth message to the base station controller and to receive a fifth message from the base station controller after the base station controller receives an acknowledgement message to a Universal Handoff Direction message sent to the mobile user station, the fifth message including a handoff commencement acknowledgement;

wherein the RACF subsystem is further configured to receive a sixth message from the target convergence server, the sixth message including an indication of a completion of a successful handoff; and wherein, upon successful handoff completion, the trunking subsystem is configured to provide a connection between the PSTN and the femtocell access point, and wherein the RACF subsystem is further configured to transmit a seventh message to the CCF subsystem, the seventh message including an indication that the mobile user station is communicating with the mobile switching station via a nailed-up trunk.

* * * * *

UNITED STATES PATENT AND TRADEMARK OFFICE
CERTIFICATE OF CORRECTION

PATENT NO. : 8,908,639 B2  Page 1 of 1
APPLICATION NO. : 13/031668
DATED : December 9, 2014
INVENTOR(S) : Nguyen et al.

It is certified that error appears in the above-identified patent and that said Letters Patent is hereby corrected as shown below:

In the Drawings:

In Fig. 4A, Sheet 8 of 19, for Tag "308", in Line 1, delete "MSA" and insert -- MUS --, therefor.

In Fig. 6A, Sheet 14 of 19, for Tag "308", in Line 1, delete "MS" and insert -- MUS --, therefor.

In the Specification:

In Column 2, Line 67, delete "(MPE)" and insert -- (MPC) --, therefor.

Signed and Sealed this
Fourteenth Day of July, 2015

Michelle K. Lee
*Director of the United States Patent and Trademark Office*